(12) United States Patent
Amira et al.

(10) Patent No.: US 7,726,888 B2
(45) Date of Patent: Jun. 1, 2010

(54) MOBILE DEVICE SUITABLE FOR SUPPORTING APPARATUS FOR SITE IMAGING WHILE IN TRANSIT

(75) Inventors: Rony Amira, Modi'in (IL); Gadi Royz, Tel Aviv (IL)

(73) Assignee: Mentorwave Technologies Ltd., Herzliya (IL)

( * ) Notice: Subject to any disclaimer, the term of this patent is extended or adjusted under 35 U.S.C. 154(b) by 693 days.

(21) Appl. No.: 11/570,448

(22) PCT Filed: Jun. 9, 2005

(86) PCT No.: PCT/IL2005/000610

§ 371 (c)(1),
(2), (4) Date: Jan. 18, 2007

(87) PCT Pub. No.: WO2005/121859

PCT Pub. Date: Dec. 22, 2005

(65) Prior Publication Data

US 2008/0035402 A1     Feb. 14, 2008

(30) Foreign Application Priority Data

Jun. 14, 2004 (IL) .................................. 162519
Oct. 19, 2004 (IL) .................................. 164708

(51) Int. Cl.
G03B 29/00 (2006.01)
(52) U.S. Cl. .................................. 396/428
(58) Field of Classification Search ................ 396/428
See application file for complete search history.

(56) References Cited

U.S. PATENT DOCUMENTS

| | | | |
|---|---|---|---|
| 4,542,909 A * | 9/1985 | Littwin et al. | 280/79.11 |
| 5,022,476 A | 6/1991 | Weege | |
| 5,172,147 A | 12/1992 | Rockhill | |
| 5,767,905 A * | 6/1998 | Archambo | 348/373 |
| 5,899,469 A | 5/1999 | Pinto et al. | |
| 6,191,842 B1 * | 2/2001 | Navarro | 352/38 |
| 6,746,029 B2 * | 6/2004 | Chu et al. | 280/47.35 |
| 6,820,980 B1 * | 11/2004 | Romanoff et al. | 352/243 |

* cited by examiner

*Primary Examiner*—W. B. Perkey
(74) *Attorney, Agent, or Firm*—Marsteller & Associates, P.C.

(57) ABSTRACT

A mobile device which supports apparatus for site imaging while in transit is disclosed. The mobile device comprises a plurality of wheels, an imaging unit having at least one camera and supported above the head of an operator, a control unit for monitoring and controlling operation of each camera and of generated image data so as to produce an interactive movie, a steering device for navigating the mobile device within the site, a measuring device for measuring the relative displacement of the mobile device, a computer for determining the relative location and orientation of the mobile device within the site and for processing data, and a monitor. In one embodiment, two of the wheels are self-aligning caster wheels, and a mechanism and method for preventing drifting during the initial advancement of the mobile device are provided. A rotating mechanism is actuated until each caster wheel achieves a trailing position.

33 Claims, 22 Drawing Sheets

MOBILE DEVICE SUITABLE FOR SUPPORTING APPARATUS FOR SITE IMAGING WHILE IN TRANSIT

FIELD OF THE INVENTION

The field of the invention relates to systems for the preparation of interactive movies, particularly for the purpose of viewing a site in panoramic fashion. More particularly, the invention relates to a mobile device for supporting an imaging unit for scanning and acquiring images from the site, and for processing these images to produce the interactive movie, while optionally preventing drifting thereof during advancement between regions of the site, to increase the quality of the interactive movie being produced

BACKGROUND OF THE INVENTION

Virtual movies are widely used for a variety of purposes, such as exhibitions, remote guidance and touring of places, education, training, electronic games, etc. Some of such movies are animated, and some others are real, in the sense of involving real frames that are photographed within a tangible site. The present invention relates to the latter case, i.e., to the case where the preparation of a virtual and interactive movie enables a user to explore a tangible site.

For example, there are some cases in which it is desired to allow a user to view a filmed representation of a site, and navigate interactively thereinafter within the site. More particularly, it is desired to produce an interactive movie enabling the user to view a desired region of a site in any selected direction, while viewing continuously changing actual images of the selected region that may be optionally combined with computer generated interactive or non-interactive events or objects.

In another, more particular example, it is desired to produce a virtual interactive movie for training personnel so that they may be familiarized with a specific site, while being provided with essential and comprehensive information concerning the site, such as its layout, its appearance, location of rooms and equipment therein. Moreover, it could be beneficial to integrate a simulated event, for example, a fire, into the movie so that the personnel may learn how to deal with some emergency procedures.

Such virtual interactive movies that enable people to navigate within a tangible site can also be used for marketing purposes, for example, allowing viewers to interactively explore sites such as real estate properties, hotels, etc.

The preparation of a virtual, interactive movie which enables navigation within a site is generally a very complicated task, and it involves a substantial effort, requiring professional and lengthy filming and editing. Also, the results are generally not so satisfactory, being far from providing to the user a real navigating and exploring feeling.

International Patent Publication No. WO2004/049263 filed on Nov. 24, 2003 by same applicant discloses a method and apparatus for producing a virtual movie for the purpose of exploring a tangible site. According to said application, a movable platform supports all the system components. The movable platform is moved within the site, while measuring the x,y coordinates and the orientation (angle), producing site nodes (as defined in said application), acquiring site images, up to 360° field of regard, and performing additional processing tasks including the processing and preparation of the final movie.

Such a movable platform, as described in WO2004/049263 can generally perform this task. However, there are some problems associated with operating such platform, as follows:

a. When the system acquires images from the rear of the platform, the operator has to hide from view of each of the cameras in order not to appear in the acquired images.

b. The platform, which supports all the system components, is heavy, and the operator has to apply a significant force in order to move the platform and operate the system within the site.

c. As the platform has to smoothly move along the site, which generally includes a narrow passageway, such as a door, or negotiate around an obstacle, this task becomes even more complicated.

d. Additionally, as in many cases in which the system has to be transported from one site to another, it is important to have a relatively light weight platform, which also has a small volume.

e. Moreover, the movable platform drifts as the supporting caster wheels return to a normal trailing position, following a change in direction, resulting in a bothersome wobbling sensation in the produced virtual movie.

It is therefore an object of the present invention to provide a mobile device which supports apparatus for imaging a site to be displayed in an interactive virtual movie and which overcomes all the above drawbacks.

It is an additional object of the present invention to provide a mobile device which is of relatively small dimensions, of relatively light weight, and with good maneuverability.

It is an additional object of the present invention to provide an operator with means for conveniently directing the mobile device to a desired region of a site, and means for conveniently controlling the operation of the imaging apparatus.

It is yet an additional object of the present invention to provide the mobile device with means for preventing drifting thereof during advancement between regions of the site, to increase the quality of the interactive movie being produced.

Other objects and advantages of the invention will become apparent as the description proceeds.

SUMMARY OF THE INVENTION

The present invention is directed to a mobile device which supports apparatus for site imaging while in transit, comprising:

a) a frame;
b) a plurality of supporting wheels;
c) an imaging unit carried by the mobile device comprising at least one camera, a control unit for monitoring and controlling operation of said at least one camera and of image data generated thereby so as to produce an interactive movie, and a base attached to said frame for supporting and maintaining said imaging unit above the level of the head of an operator;
d) drive means;
e) steering means for navigating the mobile device within the site;
f) measuring means, for measuring the relative x,y displacement and angle change of the mobile device;
g) battery means for supplying power to said imaging unit;
h) a computer for determining the relative location and orientation of said mobile device within the site, for processing data, and for initiating control operations; and i) a monitor in data communication with said imaging unit and with said computer and which is supportable by the frame.

In one aspect, the mobile device is a one-seat motorized structure in the form of a motorized wheelchair.

In one embodiment of the invention, two of the plurality of wheels are self-aligning caster wheels, the mobile device further comprising a mechanism for preventing drifting during the initial advancement of the mobile device which is adapted to rotate the caster wheels to a trailing position prior to said initial advancement.

As referred to herein, a "self-aligning caster wheel" is one that is rotatably mounted to a bracket, which in turn is pivotally connected to a swivel mount for rotation about a generally vertical swivel axis, such that the horizontal rotation axis of the caster wheel is horizontally offset from the swivel axis. After a caster wheel has pivoted about the swivel axis, following a change in direction of the mobile device (referred herein as "during the initial advancement,") the caster wheel will automatically swivel such that its horizontal axis is behind the swivel axis (hereinafter referred as being in a "trailing position") during forward displacement of the mobile device.

Normally, without actuation of the caster wheels setting means, when the caster wheels are not in a trailing position, and the mobile device move forward, the mobile device temporarily drifts as the caster wheels swivel into a trailing position while continuing to rotate about their horizontal rotation axis. As referred to herein, "drifting" means lateral motion relative to an intended forward path of the mobile device, which may be characterized by continuous or sporadic inward and outward movement, wobbling, shaking, shimmying, swaying, and the like.

In one embodiment of the invention, the mechanism for preventing drifting comprises a motor for rotating the swivel axis of each caster wheel, when the caster wheels are not in a trailing position.

In a second embodiment of the invention, the mechanism for preventing drifting comprises means for raising a cross member of the frame through which a swivel mount of each caster wheel protrudes and means for rotating a raised caster wheel to a trailing position.

Preferably, the cross member raising means is a jack means, a pressing member, such as a wheel, being lowered onto a ground surface in the vicinity of the jack means upon actuation of said jack means with a sufficient force to raise the cross member.

In one aspect, the caster wheel rotating means comprises an axially displaceable rod and a tubular member eccentrically mounted on a circular top of each swivel mount, said rod adapted to engage said tubular member upon being axially displaced and to rotate each caster wheel to a trailing position.

After the caster wheels are set to a trailing position, the pressing member is raised, thereby allowing the mobile device to advance in a forward direction without drifting. An interactive virtual movie of the imaged site may therefore be viewed continuously and smoothly, without any abrupt changes due to an unintended change in direction.

In one aspect, the mobile device further comprises means for synchronizing the operation of the cross member raising means and the caster wheel rotating means such that the caster wheel rotating means is actuated following actuation of the cross member raising means.

The measuring means is a set of displacement sensors attached to the frame proximate to one or more supporting wheels of the mobile device. The displacement sensors, e.g. encoder means, are preferably attached proximate to two supporting wheels of the mobile device, e.g. the two front wheels, and are adapted to measure the rotational displacement of each of the wheels.

Preferably
a) the steering means is in the form of a joystick;
b) the base of the imaging unit is rotatable and the mobile device further comprises means for rotating said base;
c) the mobile device further comprises a touchpad for transmitting data;
d) two motors for independently driving two supporting wheels, respectively, which are not caster wheels;
e) the mobile device further comprises two auxiliary wheels, for traversing uneven terrain or obstacles in the path of the mobile device and for preventing the tipping over of the mobile device;
f) the mobile device further comprises indicating means, such as a laser beam or of a strip of metal, for determining the relative position of the mobile device within the site.
g) the frame is collapsible and components of the mobile device are capable of being completely disassembled.

The mobile device is particularly suitable for supporting apparatus for imaging a site to be viewed in panoramic and interactive fashion while in transit.

As referred to herein, the terms "imaging" and "filming" may be used interchangeably.

In one embodiment, the imaging unit comprises a camera that can image 360 degrees and in that case, there is no need for rotatable imaging unit base.

In one aspect, the imaging unit comprises at least one camera retained by a housing connected to the rotatable base and calibration means for each camera. The calibration means is adapted to electronically equalize the picture captured by each camera.

The calibration means is also adapted to adjust the circumferential distance between adjacent cameras and to adjust the pitch of each camera housing with respect to the base. Furthermore, the calibration means comprises means for leveling the rotatable base.

In one aspect, the imaging unit further comprises an upwardly directed camera.

In one aspect, the imaging unit is suitable for site imaging when the mobile device is maintained in a stationary position at a target point.

The present invention is also directed to a method for preventing temporary drifting of a mobile device which supports apparatus for site imaging while in transit, comprising:
a) providing a mobile device comprising a plurality of wheels two of which are self-aligning caster wheels; imaging apparatus carried by said mobile device and being supported above said plurality of wheels; and a mechanism for rotating the caster wheels to a trailing position;
b) prior to advancing the mobile device along a desired path, determining whether the caster wheels are in a trailing position;
c) if the caster wheels are not in a trailing position, actuating said rotating mechanism until each caster wheel achieves a trailing position;
d) operating said site imaging apparatus; and
e) advancing the mobile device along said desired path.

In one embodiment, the method of the invention comprises the following steps:
a) providing a mobile device comprising a frame; two front wheels each of which is independently driven by a motor; two rear self-aligning caster wheels; steering means for navigating the mobile device within the site;

measuring means for measuring the relative x,y displacement of the mobile device and the angular orientation; a computer for determining the relative location of said mobile device within the site, for processing data, and for initiating control operations;
b) selecting target points defining a desired imaging route, along which the mobile device is to advance;
c) visibly marking each target point on a ground surface;
d) navigating the mobile device between two adjacent target points;
e) operating the imaging apparatus at node points interposed between said two adjacent target points;
f) positioning the mobile device at a given target point by determining when a visual indicator coincides with the corresponding marking of said given target point;
g) stopping operation of said motors;
h) imaging a region of the site by a wide angle field of view at said given target point;
i) if the mobile device changed direction in step d), actuating the rotating means until each caster wheel achieves a trailing position;
j) advancing the mobile device along said desired imaging route.
k) repeating steps (d)-(i) for additional pairs of two adjacent target points.

In one aspect of the invention, the rotating mechanism is a motor.

In another aspect of the invention, the caster wheels are rotated to a trailing position by raising a cross member of the frame through which a swivel mount of each caster wheel protrudes and rotating a raised caster wheel to a trailing position.

In one aspect, the caster wheels are raised by lowering a pressing member of a jack unit onto a ground surface with a sufficient force to raise the cross member.

In one aspect, the caster wheels are rotated by axially displacing a rod until it engages a tubular member eccentrically mounted on a circular top of each swivel mount, whereby each swivel mount is rotated and each caster wheel mounted thereon is rotated to a trailing position.

Preferably, the pressing member is raised after the caster wheels are set to a trailing position.

In one aspect, the mobile device is driven and the imaging apparatus is operated by remote control

DETAILED DESCRIPTION OF PREFERRED EMBODIMENTS

Figure 1:
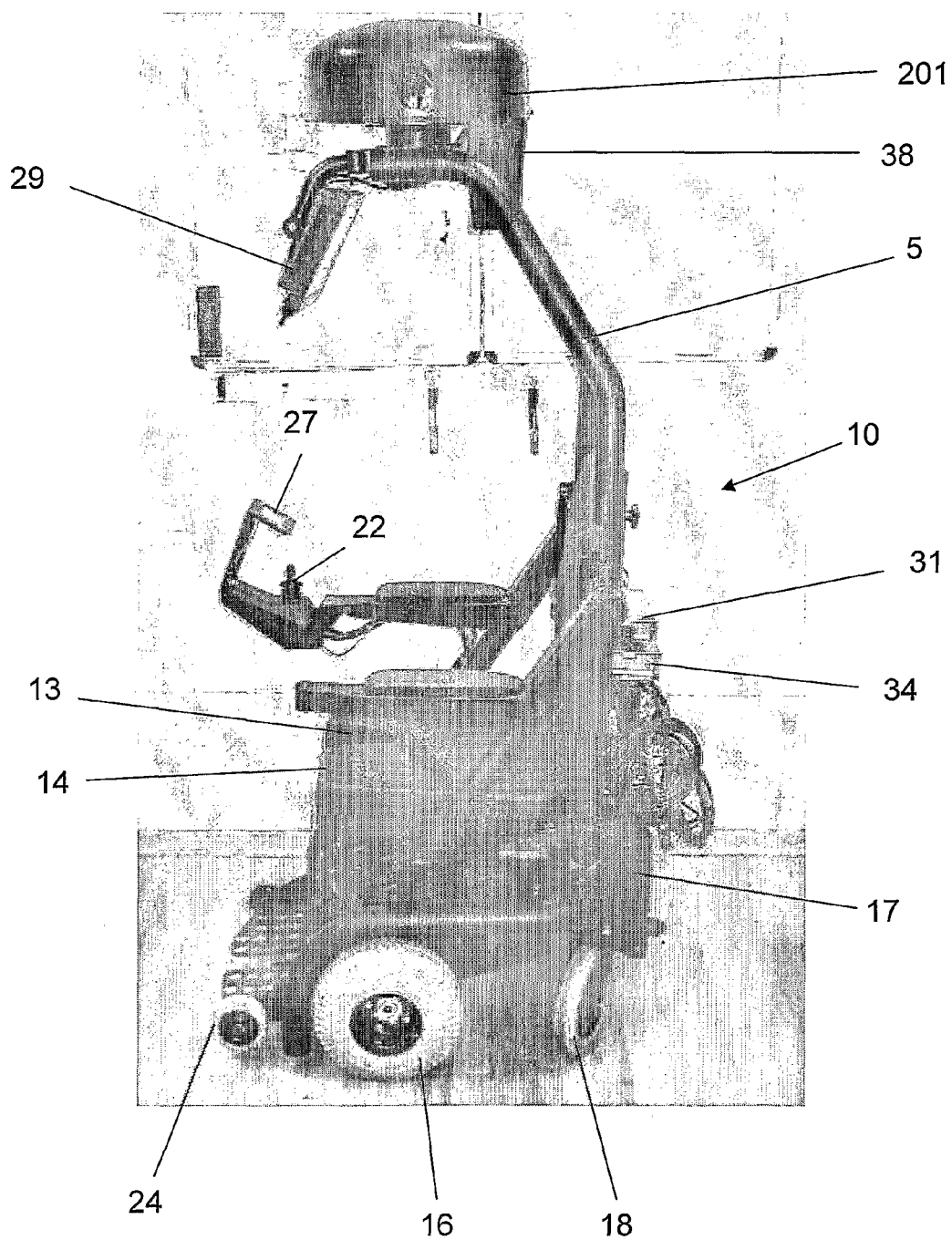
FIGS. 1 and 2 are side and rear views, respectively, of a mobile device according to an embodiment of the invention.

The present invention is a mobile device which supports apparatus for site imaging while in transit, whereby a movie of the site produced with the imaging apparatus may be viewed continuously and smoothly.

FIGS. 17 to 20 illustrate a mobile device, according to one embodiment of the present invention.

With reference to FIGS. 17-20, the mobile device which is generally designated by numeral 300 is motorized. Mobile device 300 is similar in its structure to a motorized wheelchair, and is assembled from commercially available equipment that is further modified as described herein so as to be suitable for site imaging while in transit. It should be noted, however, that the mobile device does not necessarily have to be based on a wheelchair, and can be made independently of such equipment. For the sake of brevity, not all the components of the mobile device of the present invention will necessarily be mentioned or described throughout this application, as long as they are known to exist in a conventional wheelchair.

Mobile device 300 comprises operator seat 301, which is a modified motorized wheelchair seat, two front wheels 302, at least one rear wheel 303, and imaging unit 351. Additional wheels 309 are optional, and may be used to traverse some specific obstacles, such as stairs and to prevent overturning of the mobile device 300. In the illustrated example of mobile device 300, rear wheels 303 are rotatable and front wheels 302 are fixed. However, rear wheels 303 may be fixed and front wheels 302 may be rotatable, or any other suitable deployment of fixed and/or rotatable wheels may be employed. The illustrated mobile device configuration enables excellent maneuvering and turning, essentially in the range of 360°. It will be appreciated that any other suitable mobile device configuration may also be employed. The mobile device further comprises one or more motors, preferably electric (not shown), for propelling the mobile device, and a steering device, such as a joystick, as is common in motorized wheelchairs. Furthermore, the mobile device comprises one or more batteries for supplying power to both the motors and to the other system components as necessary.

Imaging unit 351 is positioned above operator seat 301, and comprises in this embodiment two cameras 355 pointing in opposite directions. Imaging unit 351 is supported by metal frame 315, which is attached to the body of the original commercially available wheelchair. Preferably, cameras 355 are mounted on a rotatable base 320, which effects 360° rotation of the cameras, as is desired. By positioning cameras 355 above operator seat 301, and preferably above the level of the head of the operator, a site may be imaged and subsequently viewed in 360°, panoramic fashion without an undesired appearance of the operator in any of the captured images. The avoidance of imaging an operator is a significant advantage of the present invention.

The mobile device is also provided with position and orientation sensors (not shown), which in the embodiment of FIGS. 16-20 are positioned proximate to each of the two front wheels 302. Such sensors measure the movement of each of the two front wheels, and a computer can determine, based on the measured data, the x,y location and orientation of the mobile device within the site at any given time.

Mobile device 300 also comprises control unit 210 and data unit 275, which are preferably positioned in a compartment behind operator seat 301. Of course, there are also provided electric cables as needed for transmitting both power and data signals to imaging unit 351.

In operation, operator 330 sits on seat 301 and drives mobile device 300 within the site. Operator 330 operates the system for producing a virtual movie by means of lap-top computer 340, or by means of any other suitable monitor and corresponding keyboard in data communication with a computer. The monitor is positioned in such a way so as to be visible to operator 330 and at a location which preferably does not significantly obstruct his field of view. Lap-top computer 340, or any other suitable monitor, is supported by means of metal structure 325, which is also connected to the base of the original commercially available wheel chair.

As shown, mobile device 300 is suitable for carrying out the task of imaging and producing a virtual movie which provides a viewer with a sensation of walking around the site that was imaged. The mobile device is motorized, has a relatively light weight, occupies small volume, does not cause any obstruction to cameras 351, and can be easily maneuvered within the site. Moreover, the mobile device enables the operator to operate the imaging apparatus in a convenient manner.

Figure 2:
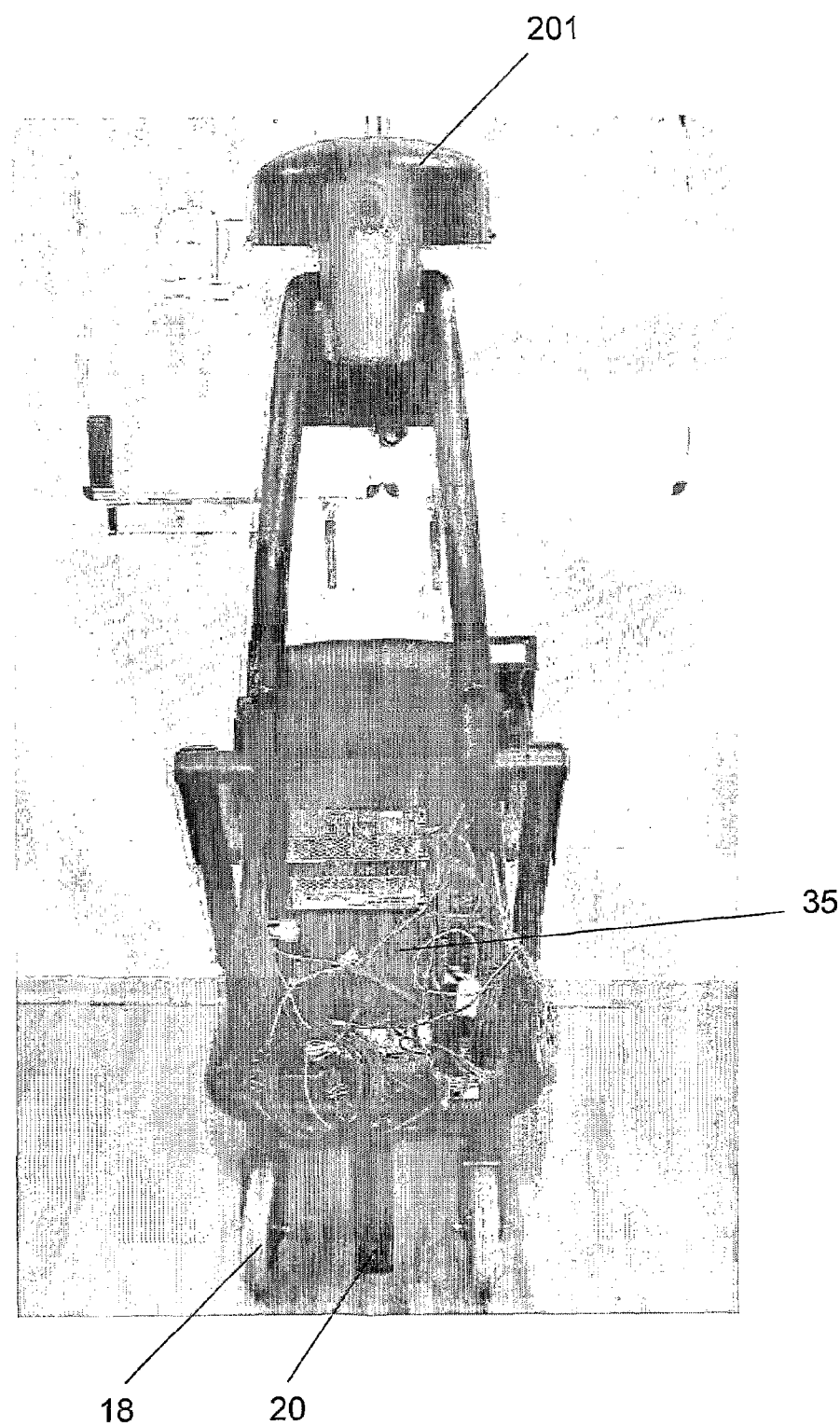

Another embodiment of the present invention is illustrated in FIGS. 1 and 2, which are side and rear views, respectively, of a mobile device generally indicated by numeral 10. Mobile device 10 is provided with a mechanism for preventing drifting during the initial advancement thereof, wherein caster wheels supporting the mobile device, after having been detected that they have been pivoted about their swivel axis, are rotated to a trailing position prior to said initial advancement. Since mobile device 10 supports apparatus for site imaging while in transit without drifting, a movie of the site may be viewed continuously and smoothly, without abrupt changes due to an unintended change in direction.

Mobile device 10 is preferably assembled from commercially available mass-produced components so as to lower the cost of the device, and comprises frame 5, operator seat 14, two front wheels 16 each of which is driven by a motor (not shown) and powered by at least one battery 17 so that the mobile device may be directed to a desired region of a site to be imaged and subsequently viewed in an interactive virtual movie, two rear self-aligning caster wheels 18, jack unit 20 for controlling the orientation of caster wheels 18 as will be described hereinafter, a steering device such as joystick 22 provided with an internal controller, two auxiliary wheels 24 to allow the mobile device to traverse uneven terrain or obstacles in the path thereof and for preventing its overturning, power supplies 31 and 34, computer 35, imaging unit 201, touchpad 27 for transmitting data, and monitor 29. Computer 35 is preferably housed in a closed compartment behind operator seat 14. Computer 35 is provided with suitable means to facilitate storage and transmission of data associated with the imaging unit, e.g. by a wired or wireless connection, a drive for a CD-ROM, DVD or CD-R, or by a network connection. Of course, electric cables are also provided for transferring both power and signals to and among all the aforementioned components.

Figure 7:
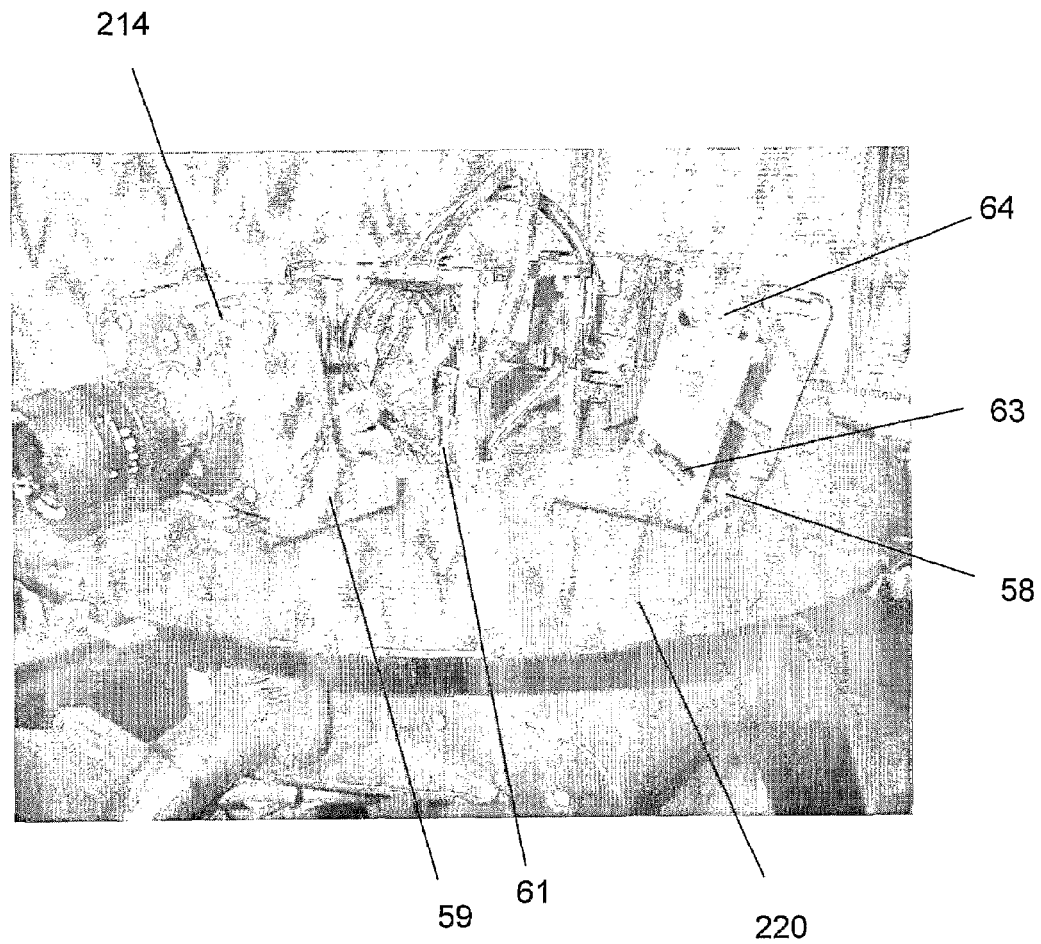
FIG. 7 is a perspective view from the side of a rotatable base which supports a camera unit.

Encoders (not shown) mounted on the axle of each front wheel 16, respectively, and inwardly positioned relative to the corresponding front wheel continuously provide to computer 35 the x,y absolute displacement of each front wheel 16. After computer 35 receives the data from each encoder and is processed, the position, relative displacement and angular orientation of a reference point of the mobile device, e.g. center 61 of circular base 220 shown in FIG. 7, are determined, as well known to those skilled in the art. Accordingly, when an operator desires to direct the mobile device to a selected region of the site, joystick 22 is suitably manipulated, each motor driving a corresponding front wheel 16 is subsequently and independently operated in conjunction with the controller so as to effect the desired motion of the mobile device, and computer 35 determines the instantaneous position, relative displacement and angular orientation of the mobile device.

It will be appreciated that the measuring means for determining the instantaneous position, relative displacement and angular orientation of the mobile device may be a GPS-based measuring system, the means described in Israeli Patent Application No. 164772 by the same applicant, or any other suitable measuring means.

Figure 8:
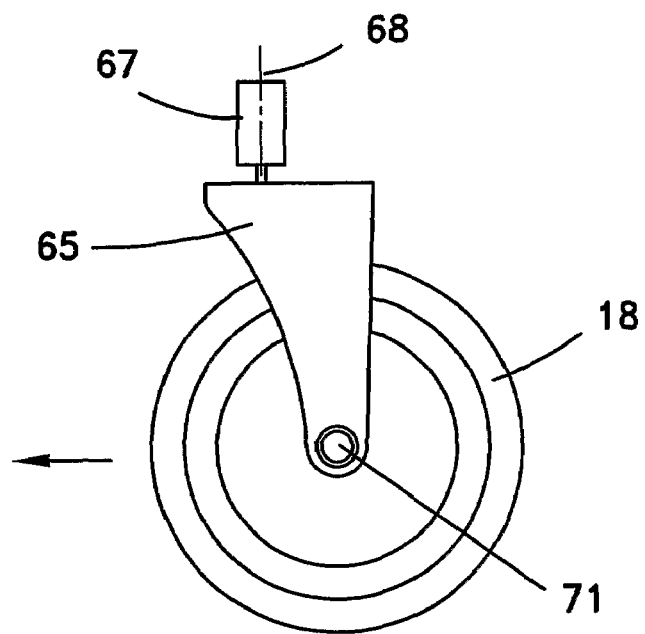
FIGS. 8 and 9 are schematic drawings of a caster wheel shown in a trailing position and with a reverse orientation, respectively.
Figure 9:
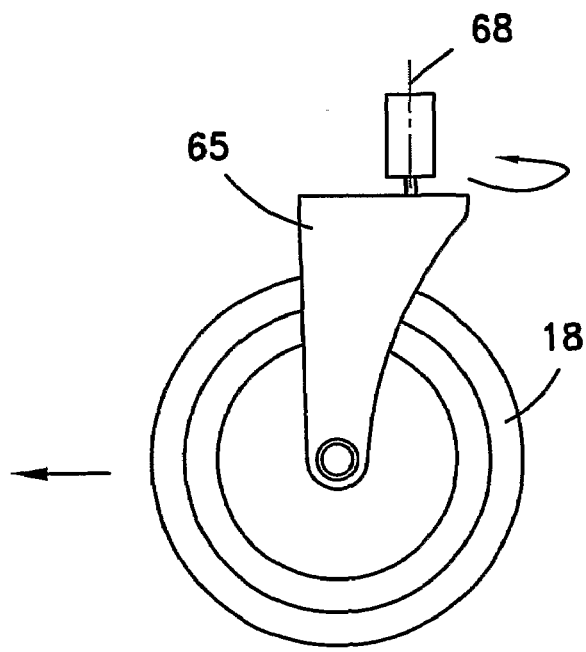
Figure 10:
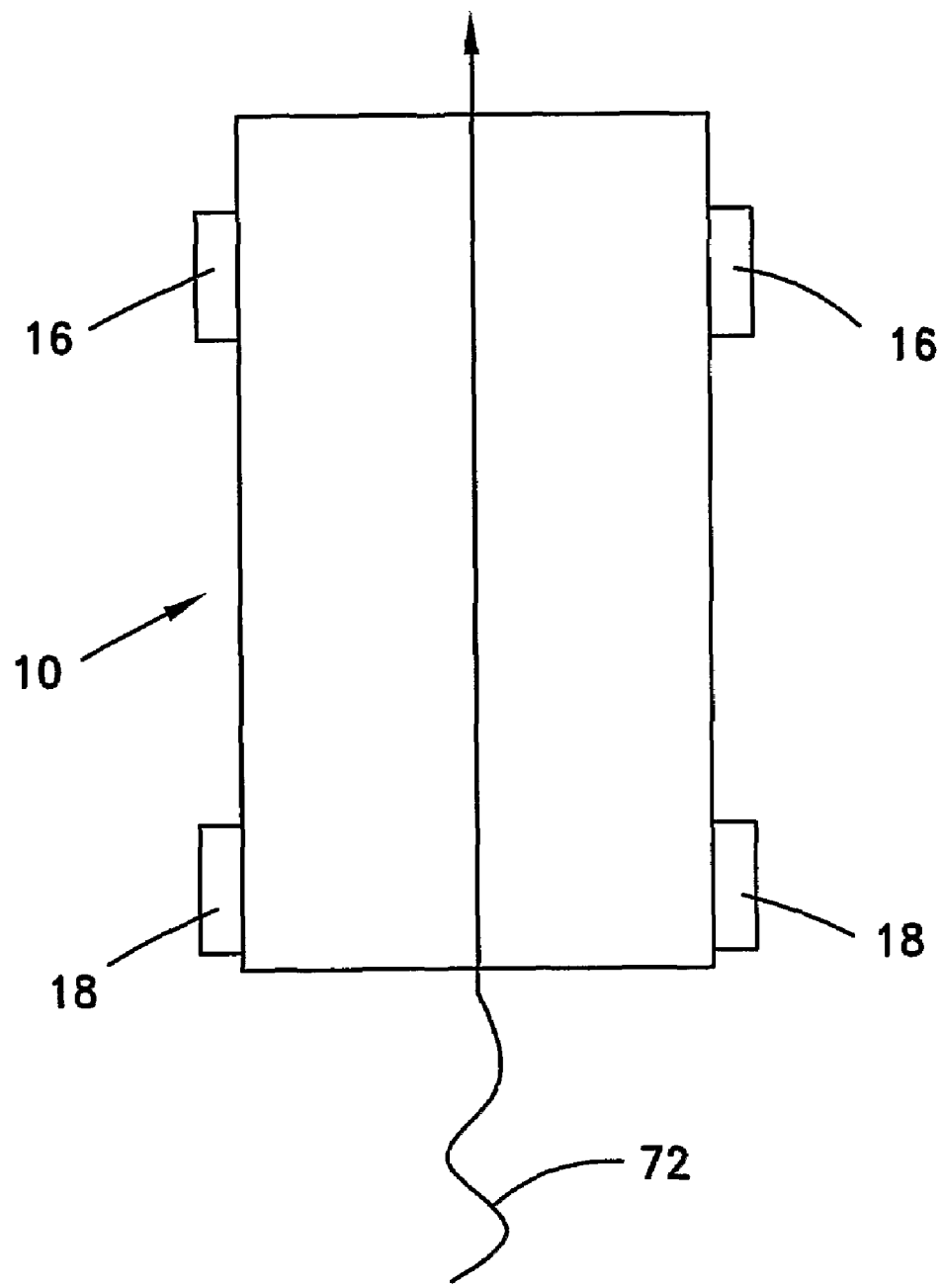
FIG. 10 is a schematic drawing of a mobile device as it drifts when a caster wheels setting means in accordance with the present invention is not implemented.

FIGS. 8-10 schematically illustrate the tendency of the mobile device to drift. Caster wheels 18 are rotatably mounted to bracket 65, which in turn is pivotally connected to swivel mount 67 for rotation about a generally vertical swivel axis 68. Each caster wheel 18 is secured to the lower end of corresponding bracket 65 by an axle 71 having a generally horizontal rotation axis and by nuts or any other appropriate attachment means. Caster wheel 18 is of the self-aligning type since the horizontal rotation axis 71 is behind, and horizontally offset from, the swivel axis 68 such that caster wheel 18 will automatically swivel into a trailing position, as shown in FIG. 8, during forward displacement of the mobile device indicated by the straight arrow.

Caster wheels 18 provide the mobile device with good maneuverability, due to the swiveling action of bracket 65, in order to easily film any desired region of the site. Bracket 65 pivots about swivel axis 68 in response to a change in motion of the mobile device. When a moment is imposed upon the mobile device, such as when one of the front wheels 16 (FIG. 1) is rotated by the corresponding motor at a faster speed than the other front wheel, the caster wheels yield under the resulting moment and partially pivot about swivel axis 68. When the mobile device advances in a reverse direction, the caster wheels pivot about swivel axis 68 by an angular displacement of 180° indicated by the curved arrow (hereinafter referred to as a "reverse orientation"), as shown in FIG. 9. The orientation of the caster wheels is maintained for a short period of time following the partial or complete pivoting thereof. Consequently, when mobile device 10 advances in a forward direction following a previous change in direction (referred herein as "during the initial advancement,") it temporarily drifts in zigzag fashion, as indicated by arrow 72 in FIG. 10, until caster wheels 18 return to a trailing position shown in FIG. 8.

In one embodiment of the invention, the mobile device is provided with a motor connected to the swivel axis of the caster wheels. When an operator determines that the caster wheels are not in a trailing position, following a change in direction of the mobile device, he operates the motor until the caster wheels return to a trailing position, in order to prevent drifting of the mobile device during its initial advancement corresponding to a subsequent imaging operation.

It will be appreciated that the mobile device and the imaging apparatus may be manipulated by remote control, as well known to those skilled in the art. The mobile device may be navigated by reference to a suitable indicating means, such as a laser beam directed along the ground surface underlying the mobile device and corresponding to the centerline thereof or a centrally positioned metal strip, for determining the relative position of the mobile device within a site. A computer carried by the mobile device may control the operation of the laser beam indicator. The orientation of the caster wheels may be detected by suitable sensors, which transmit a signal to a control center. The control center may automatically rotate the caster wheels if they are not in a trailing position, or may alert a person responsible for the operation of the mobile device.

The imaging apparatus is supported by the frame of the mobile device sufficiently above the supporting wheels so as to provide a viewer of the movie produced thereby with a sensation of walking around the site that was imaged. For most sites, such as the interior of a hotel, office, or power plant, the imaging apparatus is disposed approximately at eye level, e.g. 1.5-1.7 m above the underlying floor surface; however other applications are envisioned, such as within a horizontal duct or pipe, for which the imaging apparatus is disposed at a considerably lower height.

Figure 3:
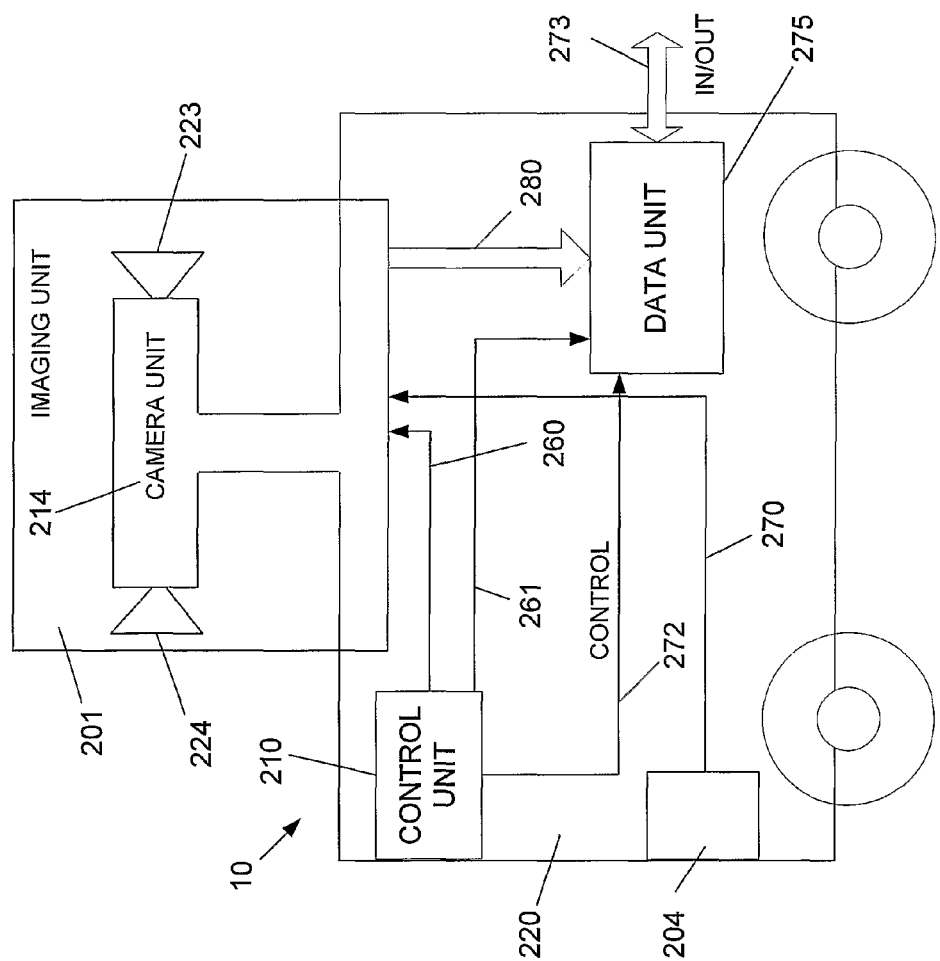
FIG. 3 is a general block diagram illustrating the structure of the system of WO2004/049263.

The system for producing a virtual movie as disclosed in WO2004/049263, the content of which is incorporated herein by reference, is briefly shown in FIG. 3, and generally comprises:

a. Imaging unit 201;
b. Orientation sensors 204;
c. Control unit 210; and
d. Data unit 275.

The imaging unit 201 comprises a camera unit 214 having one or more cameras 223 and 224 and corresponding camera housings 59 (FIG. 7), control unit 210, rotatable base 220 for supporting camera unit 214 and control unit 210, and a motor covered by motor shield 38 (FIG. 1) for rotating base 220. The orientation sensors 204 continuously provide to the imaging unit 201 the angular orientation of the mobile device. The control unit 210 controls and monitors the operation of the virtual movie producing system, such as activation and monitoring of the imaging unit 201 by means of line 260, transfer of control parameters to the data unit, which may be separate from control unit 210, by means of line 261, control of the data unit 275 by means of control line 272, and control over the transfer of the data from the imaging unit 201 to the data unit 275. The data unit 275 generally receives images from the imaging unit 201, by means of data bus 280, and processes them to produce the final virtual movie. Line 273 is used for downloading or uploading movies to the data unit 275.

The imaging unit 201 is positioned above operator seat 14 (FIG. 1) and comprises at least one camera. By rotation of base 220, camera unit 214 is also rotated, thereby achieving a wide field of view of up to 360°, if so desired. The positioning of camera unit 214 above operator seat 214 enables a 360° imaging without undesired appearance of the operator in any of the captured images. This is a significant advantage of the present invention.

Video or still frames are captured along various routes within a desired tangible site. The captured frames are then processed in a generally automated manner, usually during the advancement of the mobile device, to produce an interactive movie. Then, when the movie is activated, the user can virtually explore the site while moving along virtual routes. An interactive virtual movie produced with such a system simulates the walking of a user within a tangible site and displays in panoramic fashion various regions of interest within the site. The movie is interactive in the sense that a user viewing the movie may select a desired path within the site in real time. Accordingly, the user is shown immediately thereafter e.g. the approach to a junction, such as a junction of a corridor and the entrance of a doorway, and a change in direction in response to the selected path. By virtue of accurate positioning and imaging, the frames of the movie are shown in continuous and smooth fashion, without abrupt changes due to a change in direction.

Figure 4:
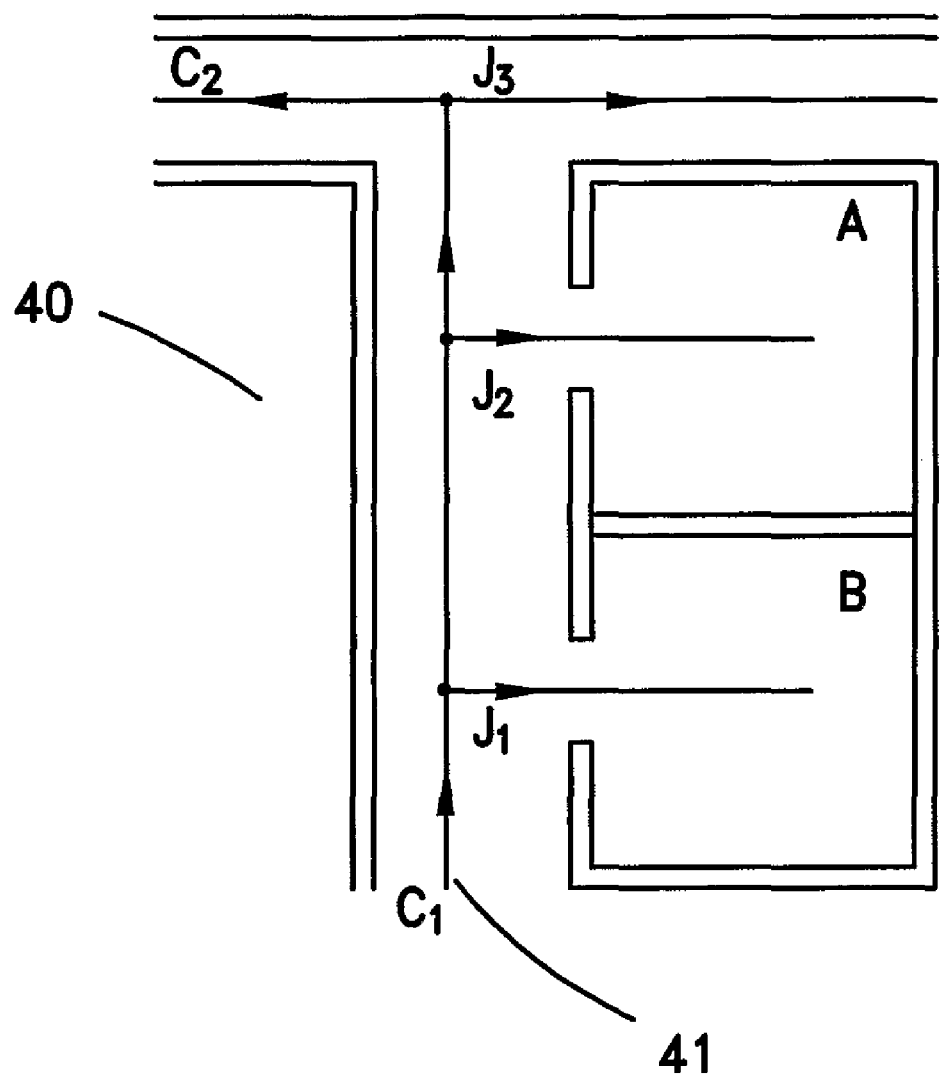
FIG. 4 is an arrangement of an exemplary site to be imaged by means of the mobile device of the invention, which is navigated along a desired route through the site.

FIG. 4 shows an exemplary site, which is an office 40 having two corridors (C1, C2) and two rooms (A, B). The viewing of an interactive virtual movie produced within such a site provides a user with a sensation of walking around the office. Beginning at starting point 41, the user seemingly walks to junction J1, at which he may either turn right into room B or continue straight ahead along corridor C1. Similarly, when arriving at junction J2, the user is allowed to visualize a right turn into room A or a straight path followed along corridor C1. When arriving at junction J3, the user is allowed to visualize either a right or left turn within corridor C2.

In order to allow a user to explore the office by viewing advancement along a corridor, a relatively limited field of view is sufficient. However, at junctions J1, J2, and J3, a wider field of view is needed, and in rooms A and B a field of view of 360° is generally needed. A wider field of view is needed at junction J1 so that the user may select a subsequent viewing option to view the end of the corridor by simulating the advancement until junction J3, or to select a simulated turn into room B to view the interior thereof, or to simulate a return to point 41 along corridor C1.

The office is filmed by means of a scanning apparatus which can take frames up to a 360° field of view. The scanning apparatus is carried by the mobile device, which advances along the selected route, while capturing photographs in a relevant field of view, from filming spots. For example, the scanning apparatus may capture images every distance of 10 cm. and scan a predefined field of view, by capturing frames.

To assist the operator of the mobile device, in one embodiment of the invention, a planned route, along which the filming will be made, starting from a predetermined origin is selected. The planned route includes a plurality of points (hereinafter referred to as "target points") at which a wide angle of view is needed. Target points are indicated on the floor of the site by suitable means such as a sticker, and serve an important role in positioning the mobile device and the camera and imaging units carried thereby, as will be described hereinafter. The site is also filmed at a plurality of points located between a pair of target points (hereinafter referred to as "nodes") which do not require a wide angle of view.

Figure 5:
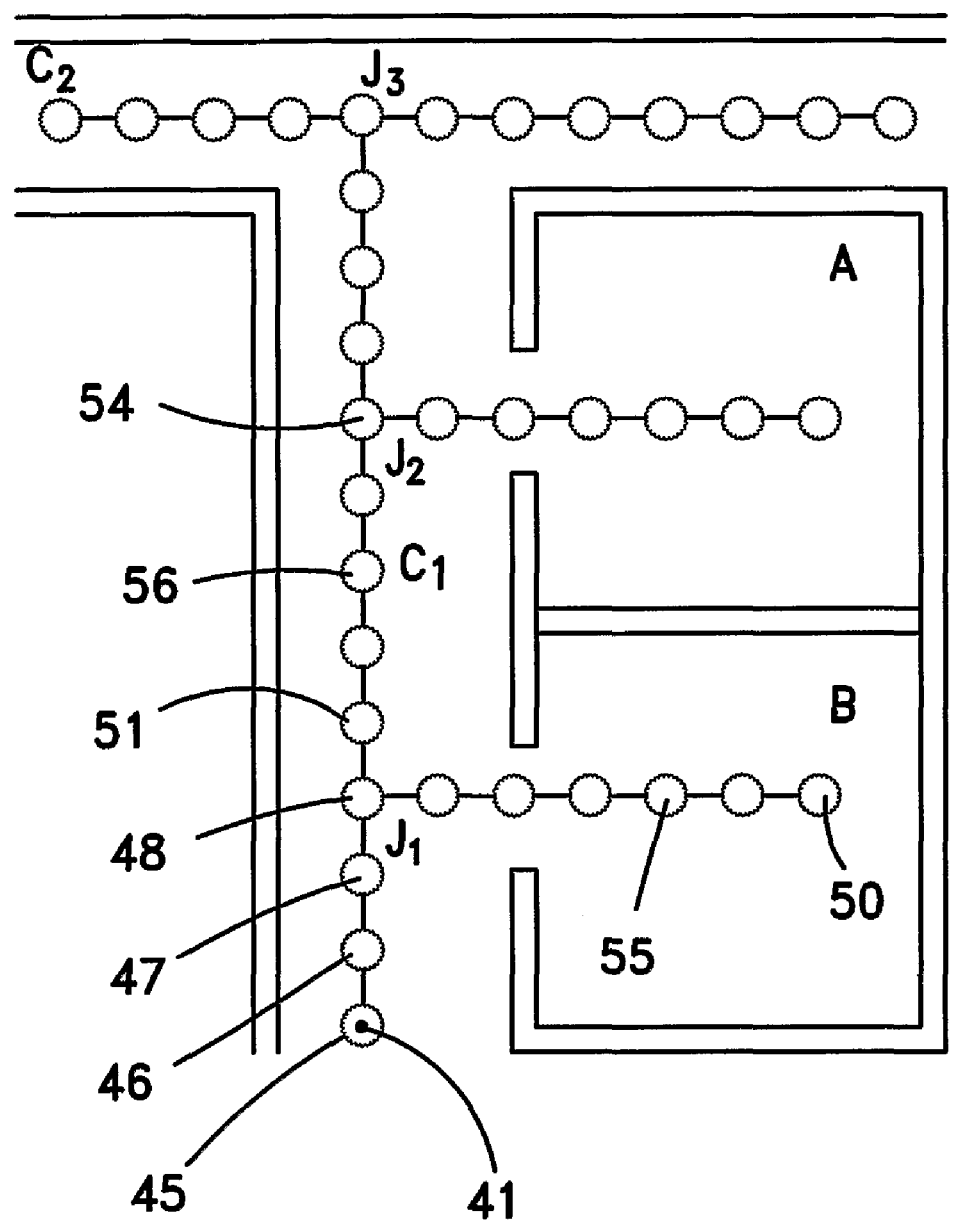
FIG. 5 is a schematic drawing illustrating the desired route of FIG. 4 as is it subdivided into nodes and target points.
Figure 6A:
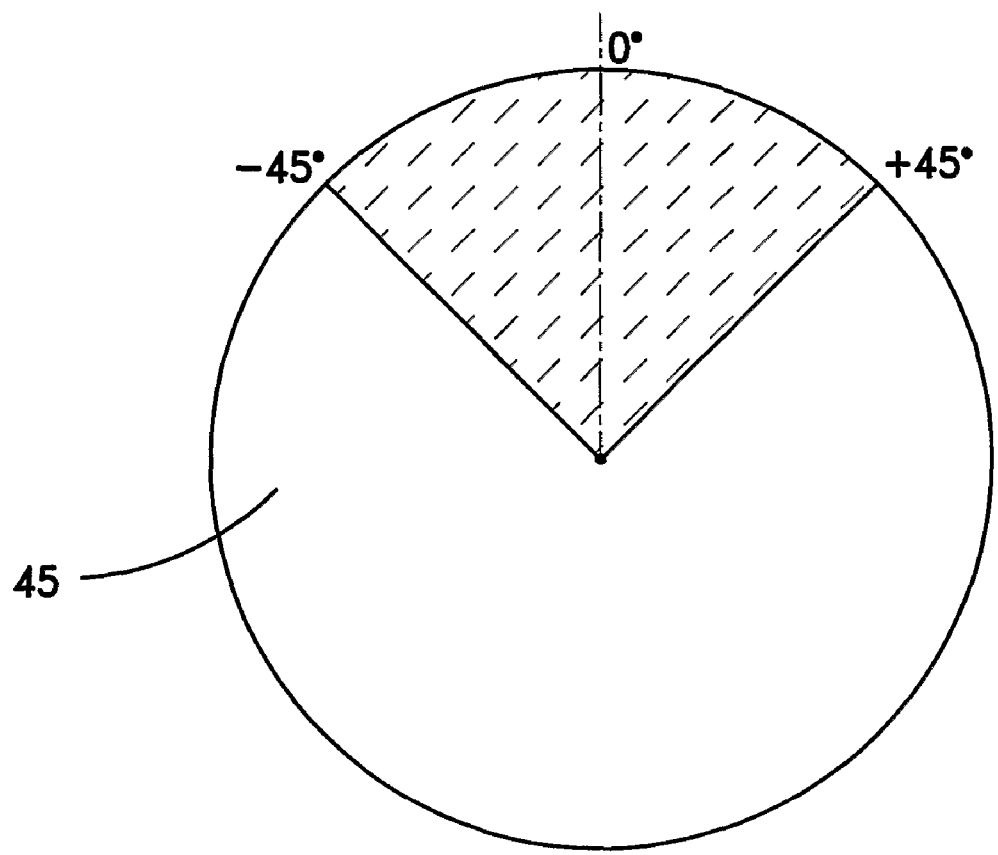
FIGS. 6a-d are examples of various camera fields suitable for imaging at different nodes indicated by FIG. 5.
Figure 6B:
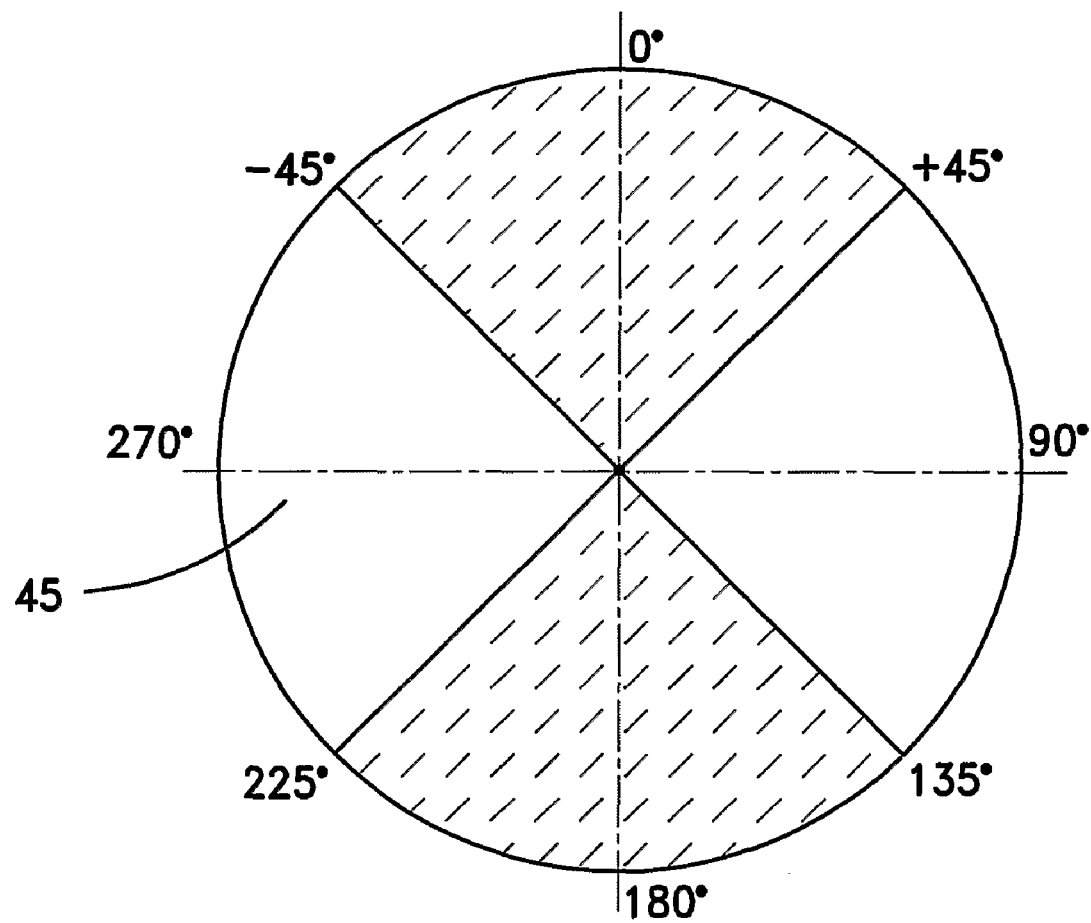
Figure 6C:
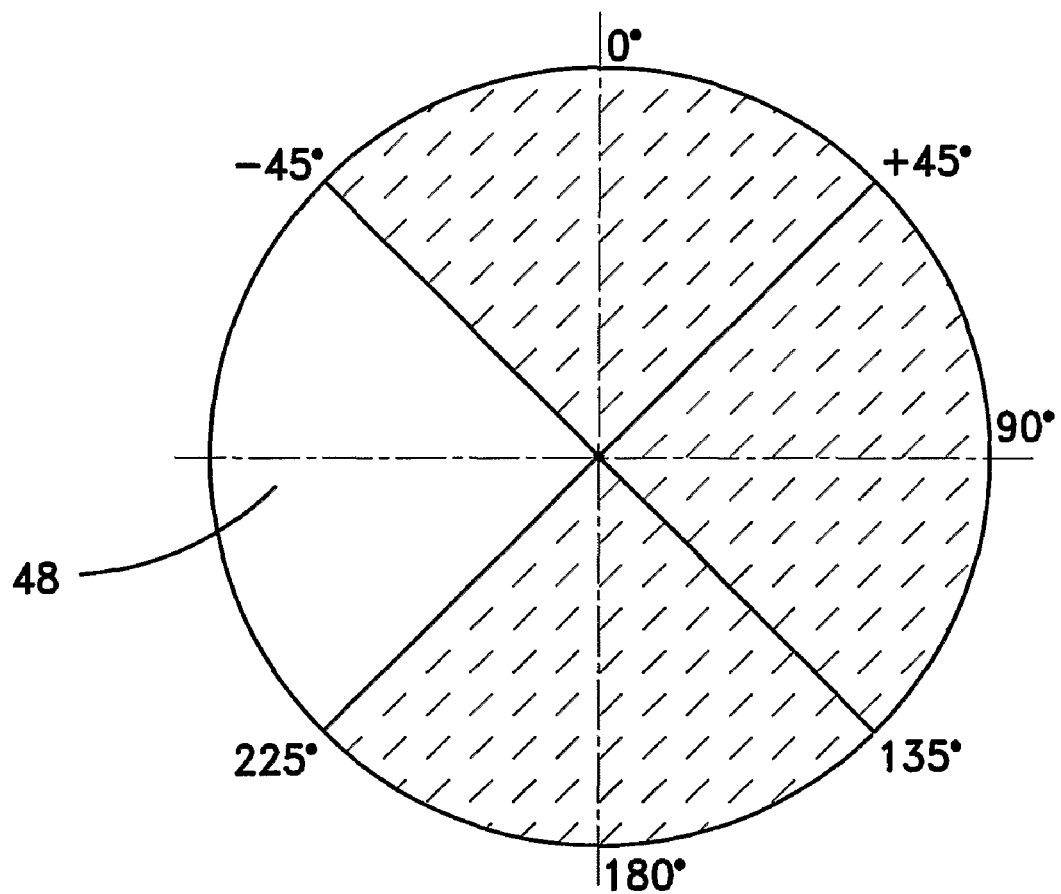
Figure 6D:
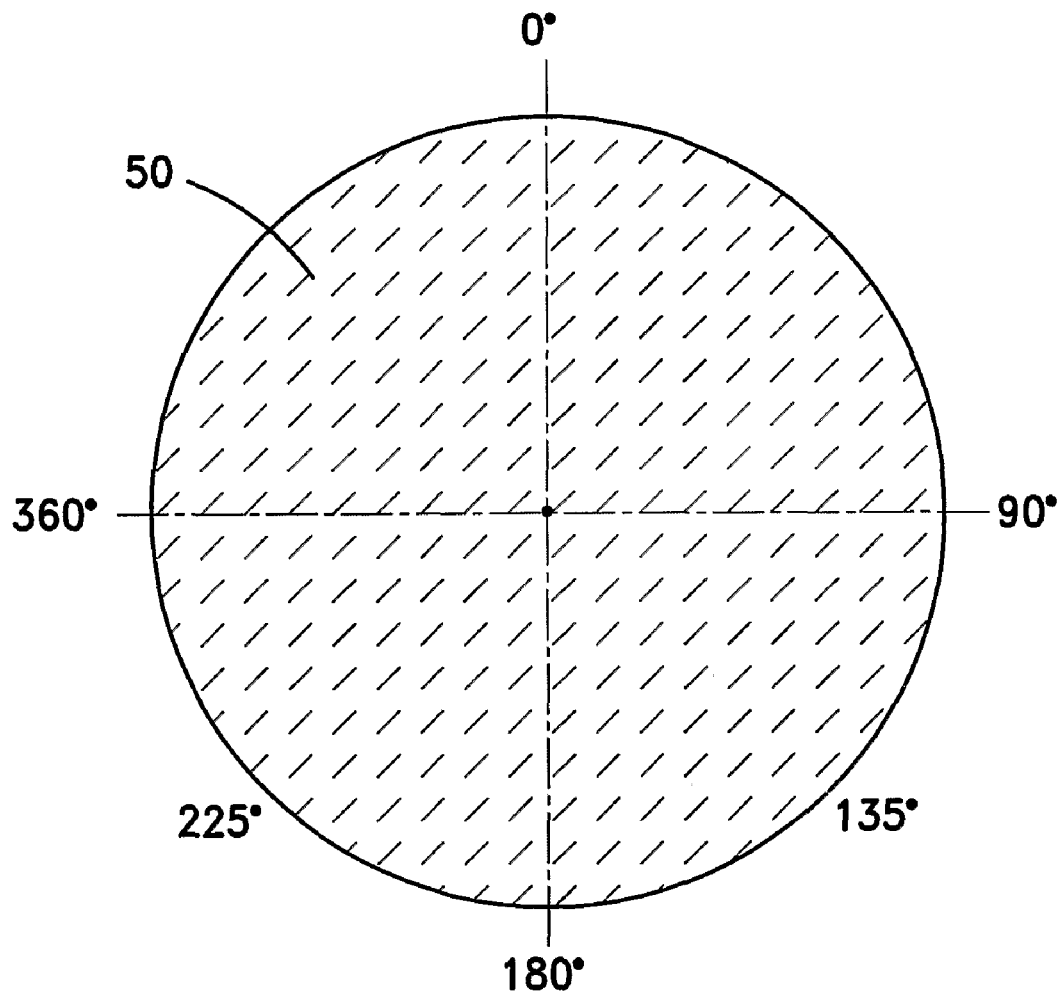

FIG. 5 illustrates a plurality of nodes corresponding to the selected route of the office 10 shown in FIG. 4. Exemplary target points include point 45 which corresponds to starting point 41, point 48 corresponding to junction J1, point 50 within room B, and point 54 corresponding to junction J2. Exemplary nodes include nodes 46, 47, 55 and 56. The position of each node is determined, and imaging related parameters that are specific to this node are also determined. Along the planed route, nodes are automatically generated when the mobile device carrying the scanning apparatus advances a predefined distance, which may be, for example, every 5-50 cm, or changes its angular orientation by a predefined angle (for example 5°). For each node, a specific camera unit field of view is generated. The term "camera unit field of view" defines herein the angular range generated for each node, which includes a cumulative field of views that are captured by each individual camera forming the camera unit. Several examples of nodes with their corresponding camera unit field of views are indicated in FIGS. 6*a-d*. The shaded areas indicate the camera unit field of view. For example, as shown in FIG. 6*a*, the camera unit field of view at target point 45 (and similarly also for nodes 46, 47, 55 and 56) may span 90°, i.e., between −45° to +45° (while the 0° is defined as the North direction). The camera unit field of view of same nodes may alternatively be as shown in FIG. 6*b*, i.e., it may span two sectors, a first one between −45° to +45°, and a second one between 225° to 135° for enabling the user to view a virtual route forwardly and backwardly from the given node. Such a double field of view may be obtained in one filming session by mounting two separate cameras within the camera unit, one facing forwardly and a second facing backwardly on a same platform. FIG. 6*c* shows a preferable field of view for target point 48 located at junction J1. At target point 48, the field of view spans a sector of 270°, i.e., between −45° to 225°. The field of view of target point 50 may be 360°, as shown in FIG. 6*d*, in order to enable viewing of all directions.

In order to assure that the produced interactive movie provides the user with a smooth view at transitions from one region of a site to another, the direction of the user field of view is prevented from being changed by an amount larger than a maximal, predefined angle between a target point and an adjacent node. That is to say, the orientation of the mobile device approaching and exiting a target point is invariably changed when a turn in direction is anticipated. Without intervention of control unit 210 (FIG. 3), the camera fields of view entering and exiting a target point will be significantly different.

Although the mobile device tends to temporarily drift following a turning maneuver, causing a bothersome wobbling sensation to be displayable during the viewing of the corresponding segment of the interactive movie, jack unit 20 (FIG. 2) is adapted to prevent the temporary drifting of the mobile device.

By activating a jack unit which is lowered onto the ground surface underlying the mobile device, the latter is raised above the ground surface and the caster wheels are forced to a trailing position, thereby preventing the temporary drifting of the mobile device. Accordingly, the jack unit is activated at every target point, preferably during the wide angle imaging of the surrounding region of the site, following a change in direction of the mobile device, in order to prevent the temporary drifting of the mobile device. After the caster wheels are set to a trailing position, the jack unit is raised and the mobile device advances along an essentially straight path.

Figure 11:
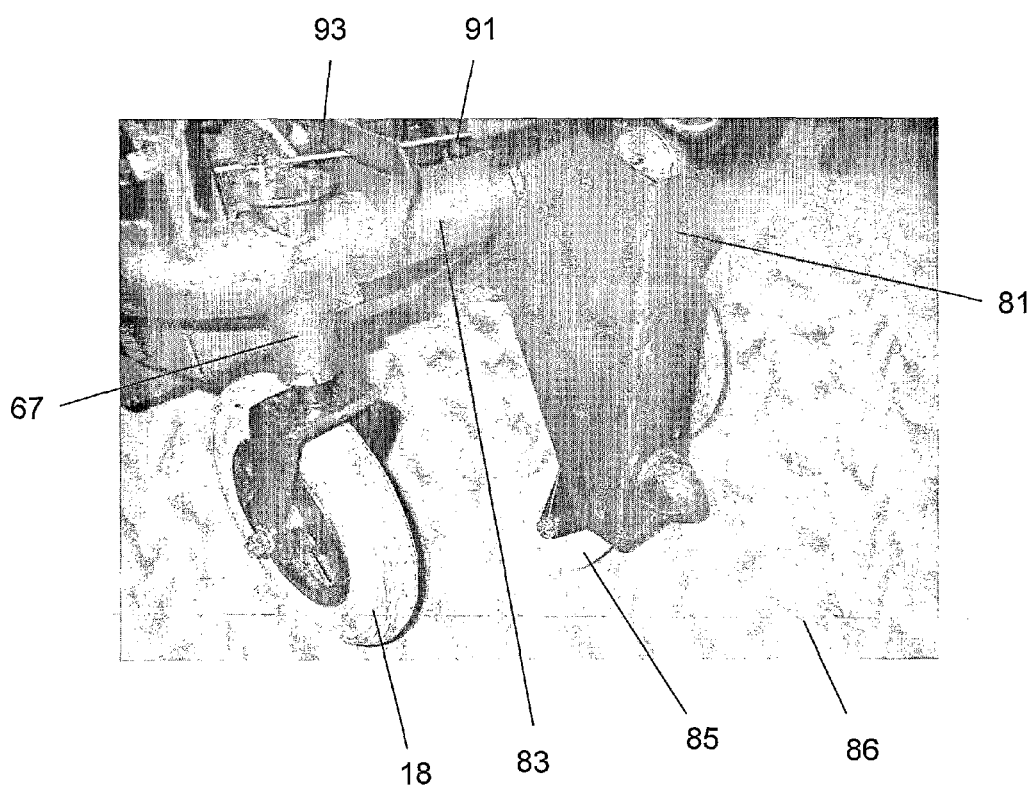
FIG. 11 is a perspective view of an exemplary jack unit.

FIGS. 11-15 illustrate an exemplary jack unit. Jack housing 81 is centrally mounted on cross member 83 of the mobile device frame at the rear thereof. Each swivel mount 67 of a corresponding caster wheel 18 protrudes through cross member 83, at an opposite end of the cross member. Pressing member 85, e.g. a wheel, is pivotally mounted at approximately the bottom of jack housing 81. After caster wheel 18 is pivoted to a reverse orientation as shown in FIG. 11, pressing member 85 is lowered onto ground surface 86 by suitable actuating means, e.g. pneumatic, hydraulic, electrically powered, and spring powered, with a sufficient force to raise cross member 83.

Figure 12:
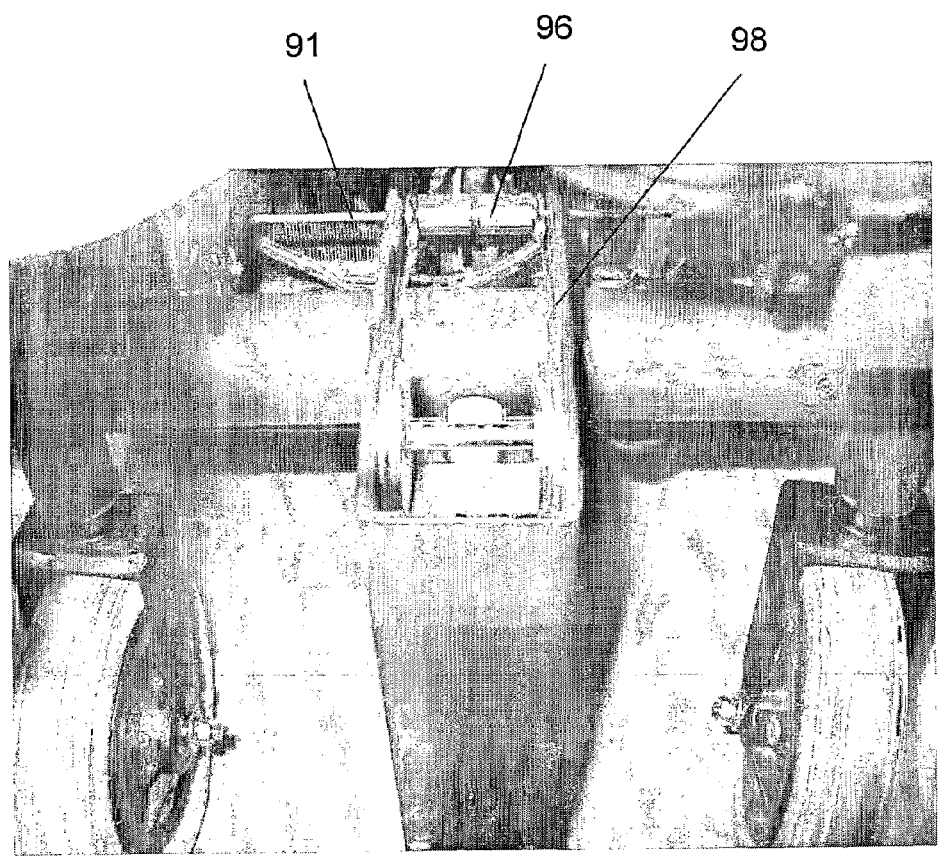
FIG. 12 is a perspective view of a sleeve fitted in the jack unit of FIG. 11, for retaining an axially displaceable rod.
Figure 13:
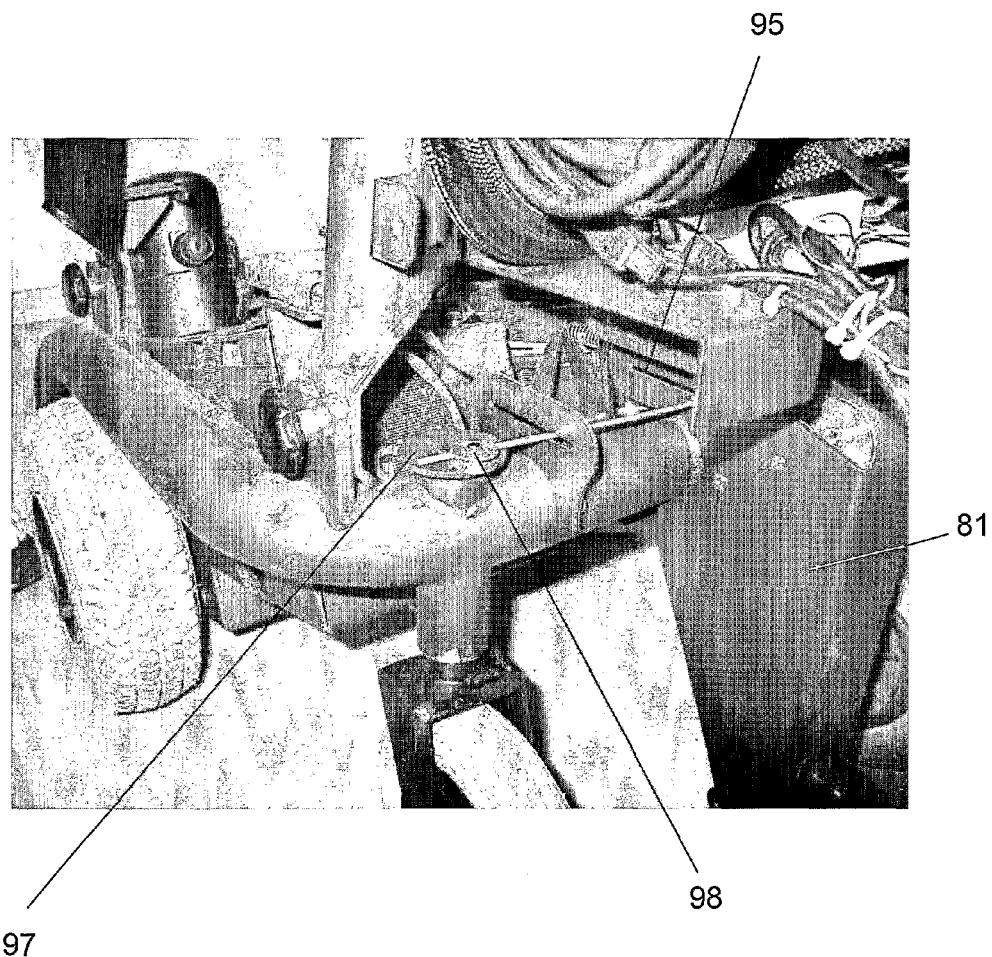
FIG. 13 is a perspective view of a tubular member engaged by the rod such that a caster wheel is urged into a trailing position.

Horizontally disposed rod 91 is used to concurrently set the orientation of the two caster wheels 18 to a trailing position. Rod 91 extends through slotted guides 93 interposed between a swivel mount 67 and jack housing 81, and through aligned slots 95 formed in the upper end of opposite walls, respectively, of the jack housing, as shown in FIG. 13, so as to be axially displaceable. Rod 91 is retained in a substantially perpendicular disposition relative to upper edge 98 of jack housing 81 by means of sleeve 96 fitted between the two walls of the jack housing, as shown in FIGS. 12 and 13. Rod 91 is axially displaceable by any suitable means such as a spring powered actuator as shown, or by a pneumatic, hydraulic, or electrically powered actuator. The actuator for axially displacing rod 91 may be independent from the actuator which vertically displaces pressing member 85, and is preferably electronically synchronized by means of computer 35 (FIG. 2) to be axially displaced following the lowering of the pressing member.

Figure 14:
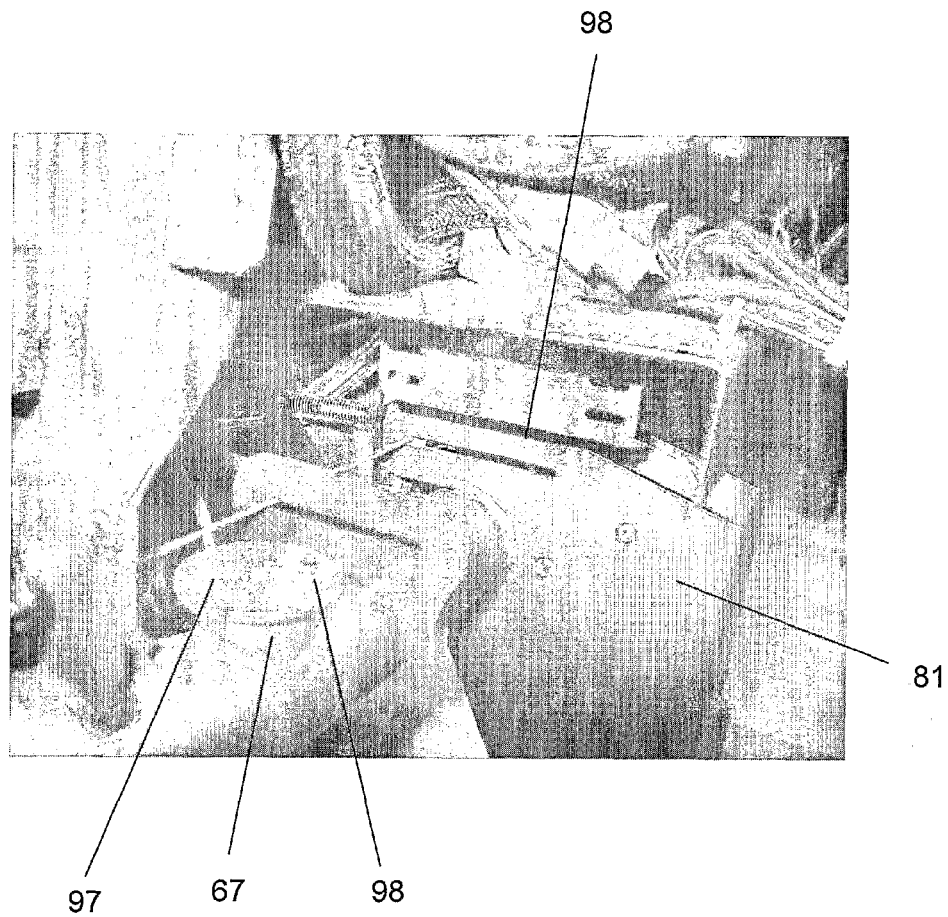
FIG. 14 is a perspective view of the rod as it is returned to its original position.
Figure 15:
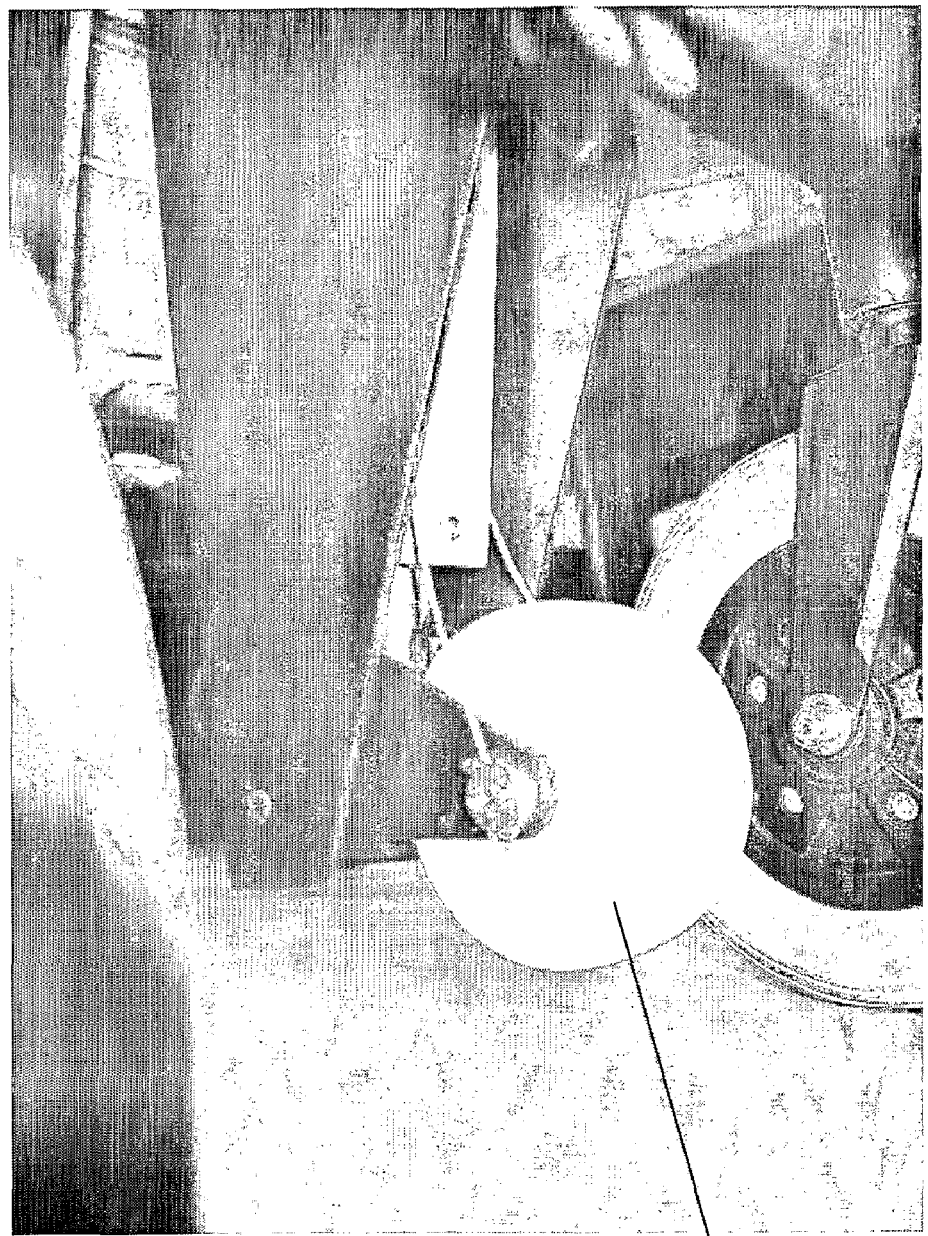
FIG. 15 is a perspective view of a pressing member of a jack unit as it is raised.

The upper end of swivel mount 67 is provided with circular planar member 97, on top of which a small tubular member 98, e.g. a pulley element, is eccentrically mounted. When rod 91 is axially displaced from the position shown in FIG. 11 to that shown in FIG. 13, the rod engages tubular member 98, forcing the latter to be angularly displaced approximately 180°. Since tubular member 98 is fixedly mounted onto planar member 97, rotation of tubular member by an angular displacement of 180° results in a similar angular displacement of caster wheel 18 until achieving a trailing position. After the caster wheel is set to a trailing position, rod 91 is released and returns to its original position, as shown in FIG. 14, and the pressing member 85 is raised, as shown in FIG. 15.

In operation, the operator sits on seat 14 (FIG. 1) and drives the mobile device within the site. Due to the relatively small width thereof, e.g. 59 cm, the mobile device can be directed through most doorways. The operator directs the mobile device to follow a selected route as defined by predetermined target points. Proper positioning of the mobile device is facilitated by means of a suitable indicator, such as an end of a laser beam or of a metallic strip coinciding with the center of a target point. Notch 13 allows the operator to view the indicator without obstruction, so as accurately position the reference point of the mobile device over a given target point. Once the mobile device is properly positioned over a target point, the jack unit is activated by means by means of a suitable operating device positioned in the vicinity of joystick 22 and wide angle imaging is carried out.

The operator operates the virtual movie preparation system by means of touchpad 27, which is ergonomically arranged so as to allow appropriate areas thereof to be effortlessly pressed and which is positioned in front of the operator so as not to significantly obstruct his field of view as the mobile device advances. Prior to directing the mobile device along a desired route, the operator inputs the desired target points by indicating their relative positions. When a site region is filmed in panoramic fashion, base 220 (FIG. 7) carrying the camera unit is rotated until achieving a 360° field of view. The base is completely rotated if only one camera is employed. Preferably, five cameras are employed, four separated by an angular distance of 90° at the side of imaging unit 201, necessitating to rotate base 220 by a similar angular distance, and one on top of the imaging unit. Alternatively, a camera which is capable of imaging a wide angle of 360° may be employed.

Figure 16:
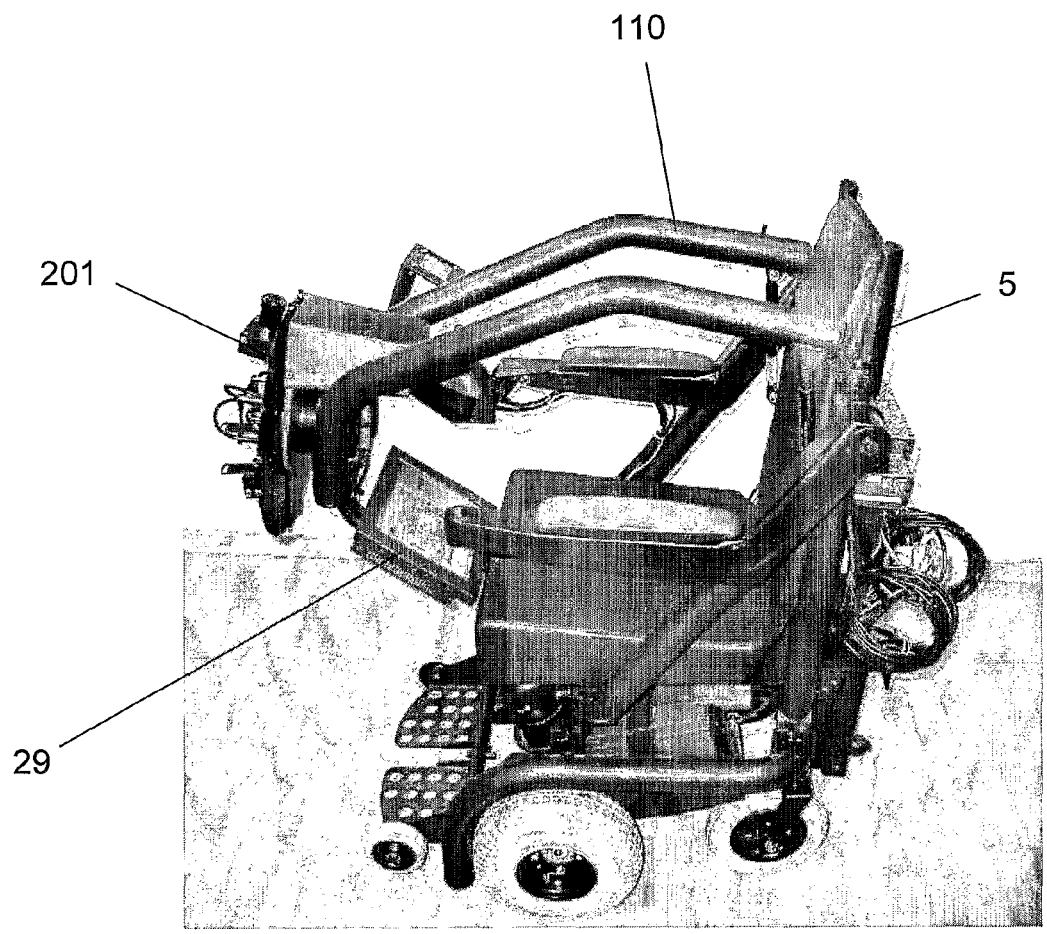
FIG. 16 is a perspective view of the mobile device from above, the frame of which is shown in a collapsed arrangement.
Figure 17:
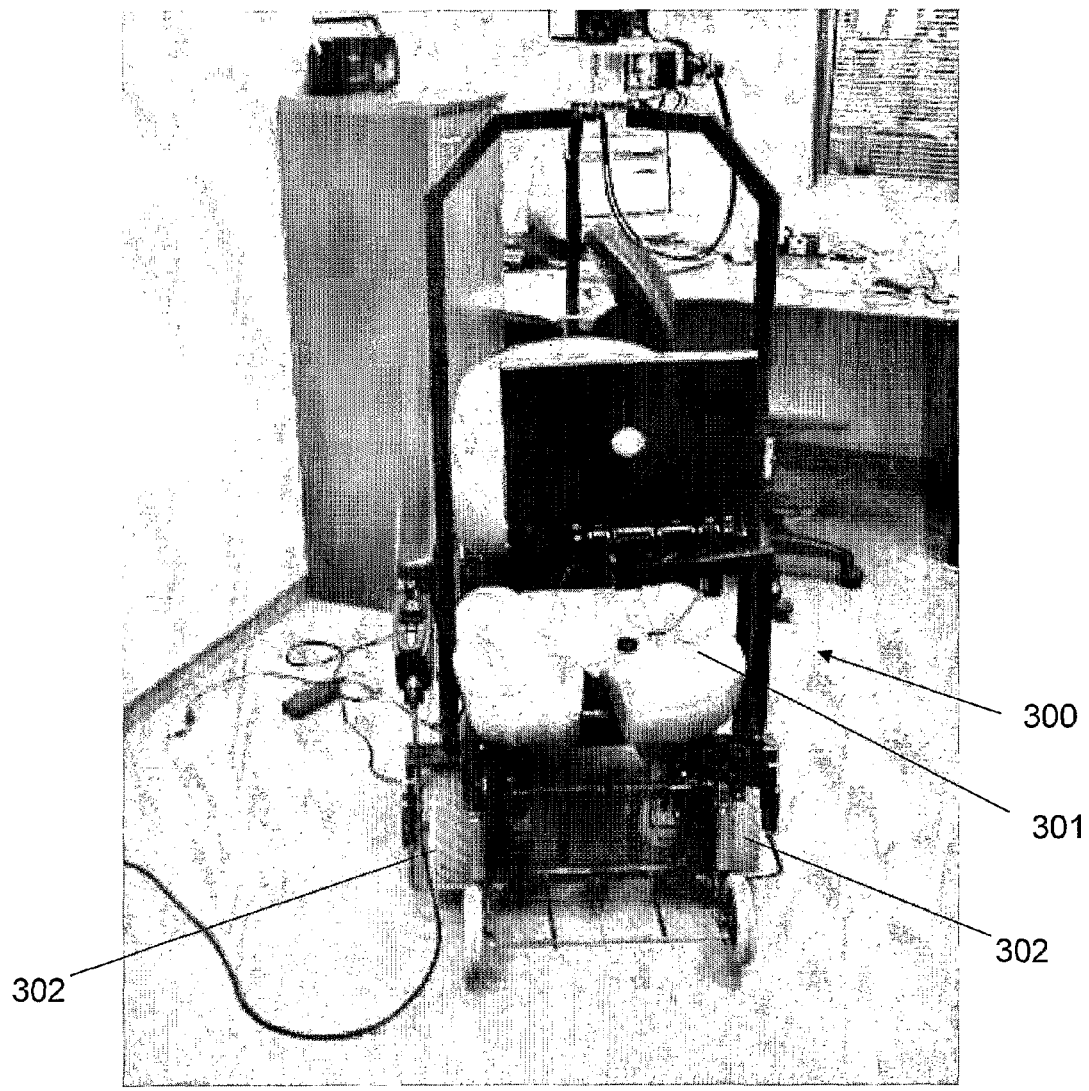
FIG. 17 is a perspective view from the front of a mobile device according to another embodiment of the present invention.
Figure 18:
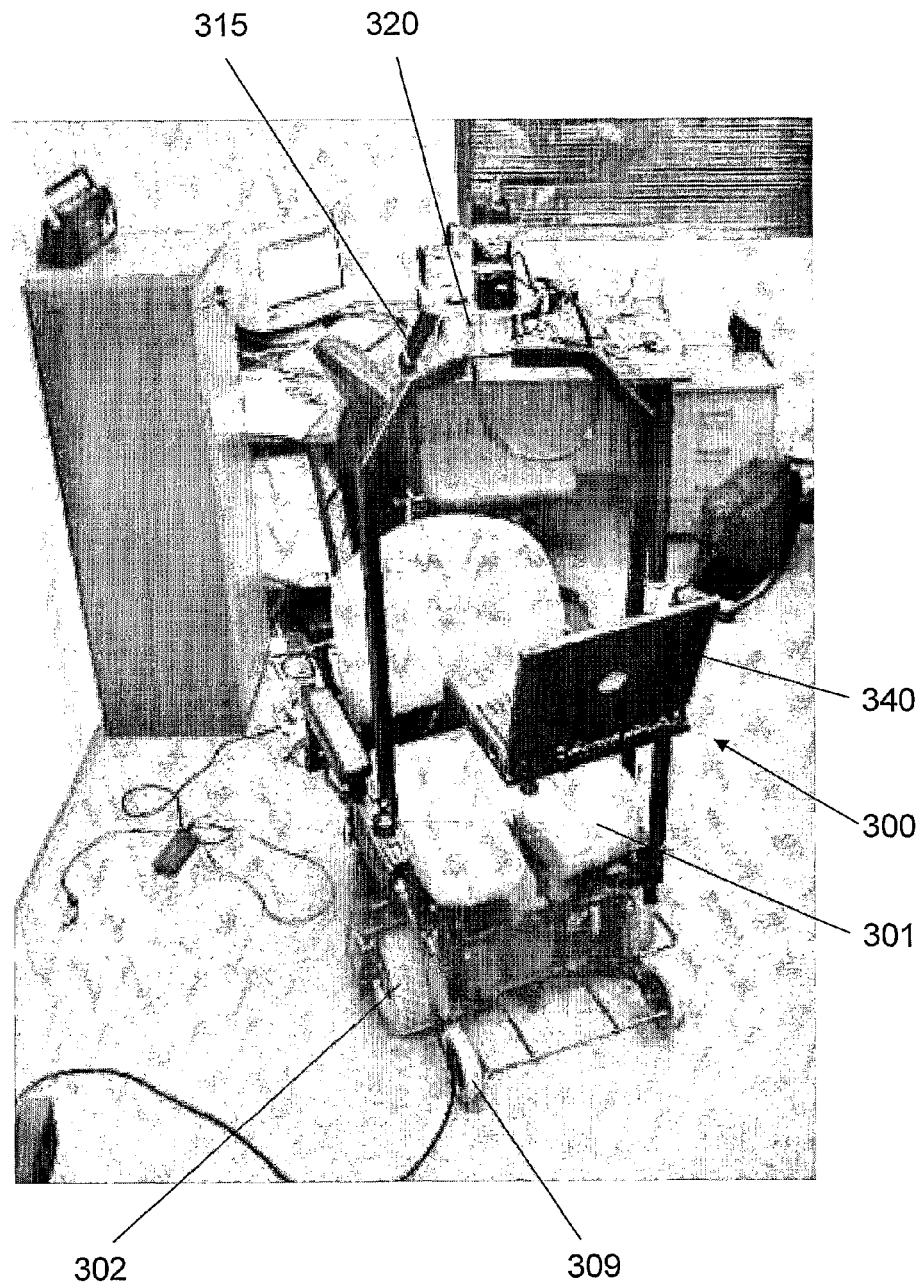
FIG. 18 is a perspective view from the top of the mobile device of FIG. 17.
Figure 19:
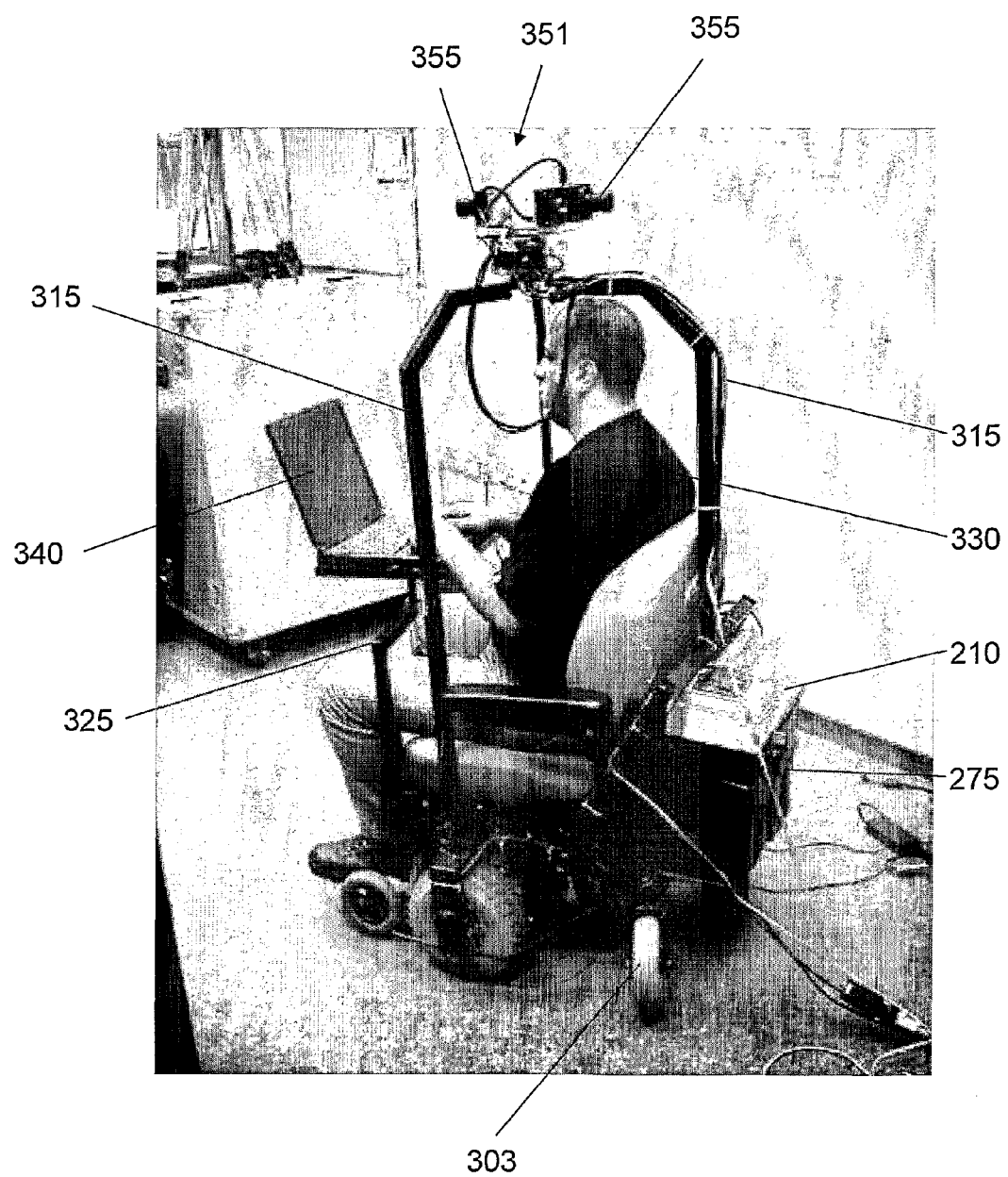
FIG. 19 is a perspective view from the side of the mobile device of FIG. 17, showing an operator operating the imaging apparatus according to an embodiment of the invention.
Figure 20:
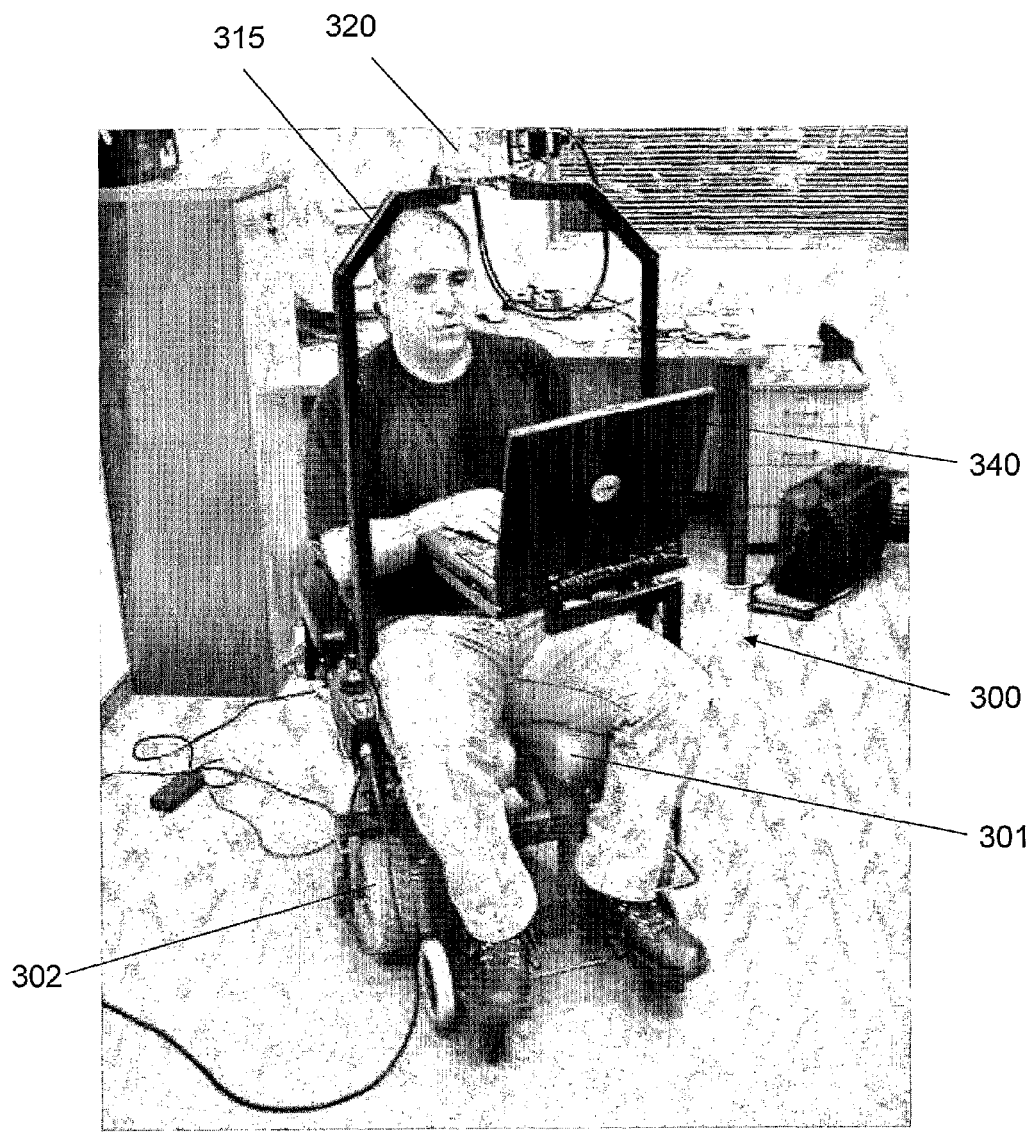
FIG. 20 is a perspective view from the front of the mobile device of FIG. 17, showing an operator operating the imaging apparatus according to an embodiment of the invention.

As shown in FIG. 16, frame 5 of the mobile device is collapsible, thereby facilitating packing and transportation thereof. In the illustrated example, upper frame elements 110 supporting imaging unit 201 and monitor 29 are downwardly pivotable, in order to reduce the dimensions of the crate in which a mobile device is packed. Advantageously, all components of the mobile device may also be disassembled to further lower shipping costs.

With reference to FIG. 7, after the mobile device is shipped to the desired destination and reassembled, each camera of camera unit 214 needs to be calibrated. The calibration ensures that a picture captured by each camera of the camera at a given node or target point will be identical, so that the interactive movie produced thereby will be viewed as smoothly and continuously as possible. Prior to the calibration process, base 220 of camera unit 214 is leveled by suitable means, such as a rotatable and lockable spherical element which supports base 220, so as to be parallel to the ground surface. After calibrating the aperture opening of each camera, the circumferential distance between each camera needs to be adjusted. Such angular adjustment is carried out by means of screw calibrator 58 positioned on the bottom of each camera housing 59. The pitch of each camera is calibrated by means of slots 63 formed in sidewall 64 and/or the bottom of camera housing 59 and by a suitable guide member.

Imaging unit 201 (FIG. 3) may also be provided with means for calibrating the pattern of a picture. A first picture is taken as a reference, and the pattern of each subsequent picture is compared to the reference picture. If the pattern of the two pictures is significantly discontinuous or different, the camera which produced the subsequent picture is calibrated so that the picture captured by each camera will be identical.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A mobile device which supports apparatus for site imaging while in transit, comprising:
   a) a frame;
   b) a plurality of supporting wheels;
   c) an imaging unit carried by the mobile device comprising at least one camera, a control unit for monitoring and controlling operation of said at least one camera and of image data generated thereby so as to produce an interactive movie, and a base attached to said frame for supporting and maintaining said imaging unit above the level of the head of an operator;
   d) drive means;
   e) steering means for navigating the mobile device within the site;
   f) measuring means, for measuring the relative x,y displacement of the mobile device and its angular orientation;
   g) battery means for supplying power to said imaging unit;
   h) a computer for determining the relative location and orientation of said mobile device within the site, for processing data, and for initiating control operations; and
   i) a monitor in data communication with said imaging unit and with said computer and which is supportable by the frame.

2. The mobile device according to claim 1, which is a one-seat motorized structure in the form of a motorized wheelchair.

3. The mobile device according to claim 1, wherein the imaging unit base is rotatable.

4. The mobile device according to claim 1, suitable for supporting apparatus for imaging a site to be viewed in panoramic and interactive fashion.

5. The mobile device according to claim 1, wherein two of the plurality of wheels are self-aligning caster wheels, the mobile device further comprising a mechanism for preventing drifting during the initial advancement of the mobile device which is adapted to rotate the caster wheels to a trailing position prior to said initial advancement.

6. The mobile device according to claim 5, wherein the mechanism for preventing drifting comprises a motor for rotating the swivel axis of each caster wheel, when the caster wheels are not in a trailing position.

7. The mobile device according to claim 5, wherein the mechanism for preventing drifting comprises means for raising a cross member of the frame through which a swivel mount of each caster wheel protrudes and means for rotating a raised caster wheel to a trailing position.

8. The mobile device according to claim 7, wherein the cross member raising means is a jack means, a pressing member being lowered onto a ground surface in the vicinity of the jack means upon actuation of said jack means with a sufficient force to raise the cross member.

9. The mobile device according to claim 7, wherein the caster wheel rotating means comprises an axially displaceable rod and a tubular member eccentrically mounted on a circular top of each swivel mount, said rod adapted to engage said tubular member upon being axially displaced and to rotate each caster wheel to a trailing position.

10. The mobile device according to claim 8, wherein the pressing member is raisable when the caster wheels are in a trailing position.

11. The mobile device according to claim 7, further comprising means for synchronizing the operation of the cross member raising means and the caster wheel rotating means such that the caster wheel rotating means is actuated following actuation of the cross member raising means.

12. The mobile device according to claim 1. wherein the measuring means is a set of displacement sensors attached to the frame proximate to one or more supporting wheels of the mobile device.

13. The mobile device according to claim 12, wherein displacement sensors are attached proximate to two supporting wheels of the mobile device and are adapted to measure the rotational displacement of each of the wheels.

14. The mobile device according to claim 13, wherein the two wheels are the two front wheels.

15. The mobile device according to claim 13, wherein the displacement sensors are encoder means.

16. The mobile device according to claim 1, wherein the steering means is in the form of a joystick.

17. The mobile device according to claim 3, further comprising means for rotating the base of the imaging unit.

18. The mobile device according to claim 1, further comprising a touchpad for transmitting data.

19. The mobile device according to claim 5, further comprising two motors for independently driving two supporting wheels, respectively, which are not caster wheels.

20. The mobile device according to claim 1, further comprising two auxiliary wheels, for traversing uneven terrain or obstacles in the path of the mobile device and for preventing the tipping over of the mobile device.

21. The mobile device according to claim 1. further comprising indicating means, for determining the relative position of the mobile device within a site.

22. The mobile device according to claim 21, wherein the indicating means is a laser beam.

23. The mobile device according to claim 21, wherein the indicating means is a strip of metal.

24. The mobile device according to claim 1, wherein the frame is collapsible.

25. The mobile device according to claim 1, wherein components of the mobile device are capable of being completely disassembled.

26. The mobile device according to claim 1, wherein the imaging unit comprises a camera that can image 360 degrees.

27. The mobile device according to claim 1, wherein the imaging unit comprises at least one camera retained by a housing connected to the base and calibration means for each camera.

28. The mobile device according to claim 27, wherein the calibration means is adapted to electronically equalize the picture captured by each camera.

29. The mobile device according to claim 27, wherein the calibration means is adapted to adjust the circumferential distance between adjacent cameras.

30. The mobile device according to claim 27, wherein the calibration means is adapted to adjust the pitch of each camera housing with respect to the base.

31. The mobile device according to claim 27, wherein the calibration means comprises means for leveling the base.

32. The mobile device according to claim 1, wherein the imaging unit further comprises an upwardly directed camera.

33. The mobile device according to claim 1, wherein the imaging unit is suitable for site imaging when the mobile device is maintained in a stationary position at a target point.

* * * * *